United States Patent
Shoji et al.

(10) Patent No.: US 9,800,326 B2
(45) Date of Patent: Oct. 24, 2017

(54) OPTICAL TRANSMISSION DEVICE AND PROTECTION WAVELENGTH SELECTION METHOD

(71) Applicant: FUJITSU LIMITED, Kawasaki-shi, Kanagawa (JP)

(72) Inventors: Takuma Shoji, Yokohama (JP); Takashi Honda, Kawasaki (JP); Masashige Kawarai, Saitama (JP); Satoru Saitoh, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/204,282

(22) Filed: Jul. 7, 2016

(65) Prior Publication Data

US 2017/0019167 A1 Jan. 19, 2017

(30) Foreign Application Priority Data

Jul. 17, 2015 (JP) .................................. 2015-143295

(51) Int. Cl.
*H04B 10/032* (2013.01)
*H04B 10/079* (2013.01)
*H04J 14/02* (2006.01)

(52) U.S. Cl.
CPC ....... *H04B 10/032* (2013.01); *H04B 10/0795* (2013.01); *H04J 14/0256* (2013.01); *H04J 14/0295* (2013.01)

(58) Field of Classification Search
CPC .............. H04B 10/032; H04B 10/0795; H04J 14/0256; H04J 14/0295

USPC ............................................................ 398/1
See application file for complete search history.

(56) References Cited

U.S. PATENT DOCUMENTS

| 6,324,318 B1* | 11/2001 | Suzuki | H04J 14/0221 385/1 |
| 2009/0080906 A1* | 3/2009 | Tao | H04B 10/61 398/209 |
| 2009/0245815 A1* | 10/2009 | Zhang | H04B 10/61 398/208 |
| 2011/0188866 A1* | 8/2011 | Maeda | H04B 10/06 398/162 |

FOREIGN PATENT DOCUMENTS

| JP | 2011-130078 | 6/2011 |
| JP | 2011-160146 | 8/2011 |

* cited by examiner

*Primary Examiner* — Dalzid Singh
(74) *Attorney, Agent, or Firm* — Staas & Halsey LLP

(57) ABSTRACT

There is provided an optical transmission device including a light source configured to generate light used for coherent detection processing of reception light; a monitor configured to monitor a frequency offset between the reception light having a plurality of protection wavelengths and the light generated by the light source, based on a signal obtained by the coherent detection processing of the reception light having the plurality of protection wavelengths available for a work wavelength by the light generated by the light source; and a controller configured to select a protection wavelength to be switched to the work wavelength among the plurality of protection wavelengths, based on the frequency offset monitored by the monitor.

5 Claims, 19 Drawing Sheets

FIG.11

| WAVE-LENGTH | ROUTE | OFFSET | | | Protection CANDIDATE |
|---|---|---|---|---|---|
| | | STARTING-UP | DURING OPERATION | Total | |
| λ1 | C | xxx | xxx | xxx | BEING IN OPERATION |
| λ2 | D | xxx | 0 | xxx | |
| λ3 | D | xxx | 0 | xxx | |
| λ4 | E | xxx | 0 | xxx | |
| λ5 | E | xxx | 0 | xxx | |
| λ6 | D | xxx | 0 | xxx | |
| λ7 | C | xxx | xxx | xxx | |
| λ8 | C | xxx | xxx | xxx | P |

FIG.15

| TRP | WAVELENGTH | WAVELENGTH DIFFERENCE [MHz] |
|---|---|---|
| #1-1 | λ1 | 100 |
| | λ2 | 200 |
| | λ3 | 300 |
| #1-2 | λ1 | 200 |
| | λ2 | 100 |
| | λ3 | 300 |
| #1-3 | λ1 | 200 |
| | λ2 | 300 |
| | λ3 | 100 |

FIG.16

| WAVELENGTH | WAVELENGTH DIFFERENCE [MHz] | TRP |
|---|---|---|
| λ1 | 100 | #1-1 |
| | 200 | #1-2 |
| | 200 | #1-3 |
| λ2 | 100 | #1-2 |
| | 200 | #1-1 |
| | 300 | #1-3 |
| λ3 | 100 | #1-3 |
| | 300 | #1-1 |
| | 300 | #1-2 |

FIG.17

| WAVELENGTH | WAVELENGTH DIFFERENCE [MHz] | TRP |
|---|---|---|
| λ1 | 100 | #1-1 |
| λ2 | 100 | #1-2 |
| λ3 | 100 | #1-3 |

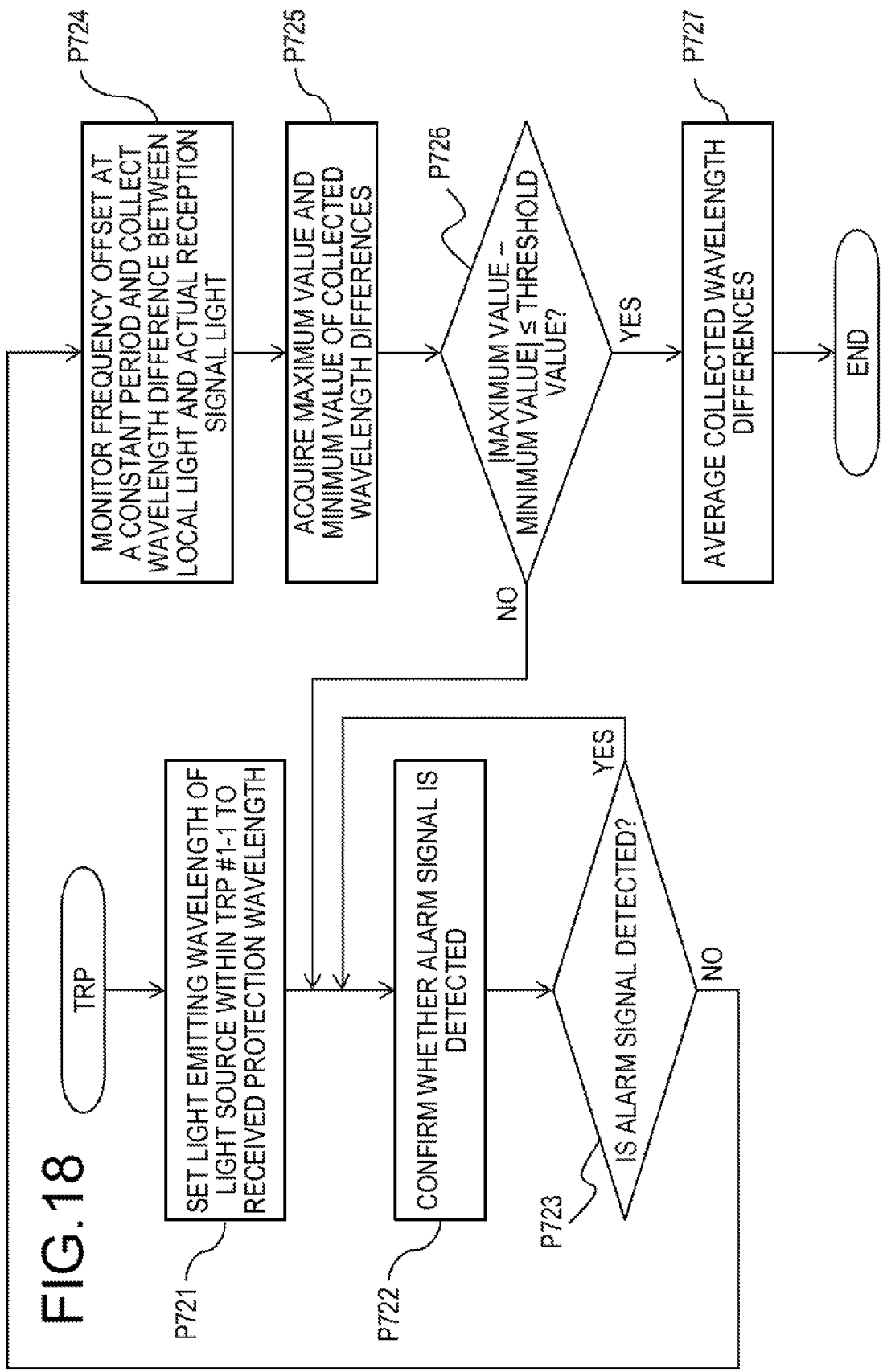

FIG.19

| TRP | WAVE-LENGTH | ROUTE | OFFSET | | | Protection CANDIDATE |
|---|---|---|---|---|---|---|
| | | | STARTING-UP | DURING OPERATION | Total | |
| #1-1 | λ1 | C | xxx | xxc | xxx | BEING IN OPERATION |
| | λ2 | D | xxx | xxd | xxx | NA |
| | λ3 | E | xxx | xxe | xxx | NA |
| | λ4 | D | xxx | xxd | xxx | |
| | λ5 | C | xxx | xxc | xxx | P |
| | λ6 | E | xxx | xxe | xxx | |
| | λ7 | D | xxx | xxd | xxx | |
| | λ8 | D | xxx | xxd | xxx | |
| #1-2 | λ1 | D | xxx | xxd | xxx | NA |
| | λ2 | D | xxx | xxd | xxx | BEING IN OPERATION |
| | λ3 | E | xxx | xxe | xxx | |
| | λ4 | D | xxx | xxd | xxx | |
| | λ5 | C | xxx | xxc | xxx | |
| | λ6 | E | xxx | xxe | xxx | P |
| | λ7 | D | xxx | xxd | xxx | |
| | λ8 | D | xxx | xxd | xxx | |
| #1-3 | λ1 | D | xxx | xxd | xxx | NA |
| | λ2 | D | xxx | xxd | xxx | NA |
| | λ3 | E | xxx | xxe | xxx | BEING IN OPERATION |
| | λ4 | D | xxx | xxd | xxx | |
| | λ5 | C | xxx | xxc | xxx | |
| | λ6 | E | xxx | xxe | xxx | |
| | λ7 | D | xxx | xxd | xxx | P |
| | λ8 | D | xxx | xxd | xxx | |
| ... | ... | ... | ... | ... | ... | ... |

OPTICAL TRANSMISSION DEVICE AND PROTECTION WAVELENGTH SELECTION METHOD

CROSS-REFERENCE TO RELATED APPLICATION

This application is based upon and claims the benefit of priority of the prior Japanese Patent Application No. 2015-143295, filed on Jul. 17, 2015, the entire contents of which are incorporated herein by references.

FIELD

The embodiments discussed herein are related to an optical transmission device and a protection wavelength selection method.

BACKGROUND

A plurality of standby paths may be set for an active path in order to enhance reliability of optical communication in an optical network. An "active path" and a "standby path" may be referred to as a "work path" and a "protection path," respectively.

When a failure occurs in communication via an active path, the active path may be switched to any of the standby paths so as to relieve the communication via an active path with the standby path.

Related techniques are disclosed in, for example, Japanese Laid-Open Patent Publication No. 2011-160146 and Japanese Laid-Open Patent Publication No. 2011-130078.

SUMMARY

According to an aspect of the invention, an optical transmission device includes: a light source configured to generate light used for coherent detection processing of reception light; a monitor configured to monitor a frequency offset between the reception light having a plurality of protection wavelengths and the light generated by the light source, based on a signal obtained by the coherent detection processing of the reception light having the plurality of protection wavelengths available for a work wavelength by the light generated by the light source; and a controller configured to select a protection wavelength to be switched to the work wavelength among the plurality of protection wavelengths, based on the frequency offset monitored by the monitor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a table illustrating an example of information of a wavelength route versus a protection wavelength selection, according to the third embodiment;

FIG. 15 is a table illustrating an example of information of a wavelength versus a wavelength difference for each TRP, according to the fourth embodiment;

FIG. 16 is a table illustrating an example of TRP sorting based on the information of a wavelength versus a wavelength difference for each TRP exemplified in FIG. 15;

FIG. 17 is a table for explaining an example of a TRP selection based on the TRP sorting exemplified in FIG. 16;

FIG. 18 is a flowchart illustrating an example of a wavelength difference collecting process in the TRP unit exemplified in FIG. 14, and FIG. 19 is a table illustrating an example of a wavelength route versus protection wavelength selection information according to the fifth embodiment.

DESCRIPTION OF EMBODIMENTS

Figure 1:
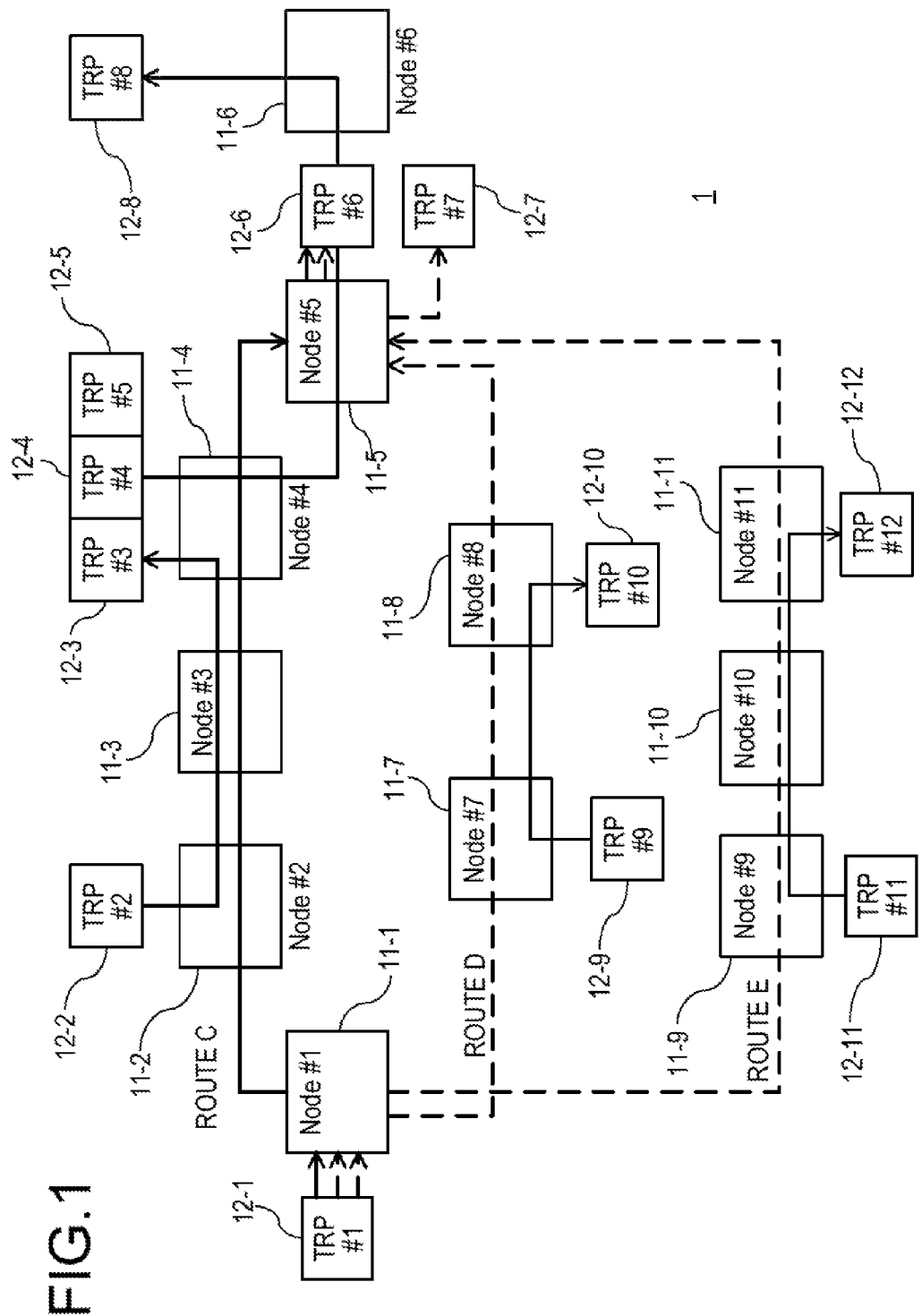
FIG. 1 is a block diagram illustrating an exemplary configuration of an optical transmission system, according to an embodiment of the present disclosure.

A standby path with the best signal quality (e.g., bit error rate (BER)) may be selected as a switching destination of an active path. It is necessary to monitor the BER of each standby path in advance in order to make it possible to select the standby path with the best signal quality.

However, it takes a relatively long time to monitor the BER and thus, a monitoring time is increased. As a result, there is a concern that a time required for switching from an active path to a standby path will be extended to become longer. In the optical communication, a path may be identified by, for example, a wavelength. Accordingly, a path switching may be regarded as a wavelength switching.

Hereinafter, embodiments of a technique for making it possible to shorten the path switching time will be described with reference to the accompanying drawings. However, the embodiments described in the following are merely illustrative and it is not intended to exclude various modifications and applying of techniques which are not specified in the following. Further, various exemplary aspects which will be described in the following may be embodied by being appropriately combined with each other. In the meantime, portions denoted by same reference numerals indicate the same or similar portions in the accompanying drawings used for the embodiments, which will be described in the following, unless otherwise distinctly expressed.

FIG. 1 is a block diagram illustrating an exemplary configuration of an optical transmission system according to an embodiment of the present disclosure. An "optical transmission system" may be referred to as an "optical network." An example of an optical network is a wavelength division multiplexing (WDM) optical network which transmits wavelength division multiplexed light (WDM light).

As illustrated in FIG. 1, an optical network 1 may include a plurality of optical transmission devices 11-1 to 11-n (#1 to #n). The "n" is an integer of two or more, and n is eleven (i.e., n=11) in the example of FIG. 1. In a case where it does not need to distinguish the optical transmission devices 11-1 to 11-n, the optical transmission devices 11-1 to 11-n may be denoted by an optical transmission devices (#i) 11-i (i is any of numbers from 1 to n), or simply denoted by an "optical transmission device 11." The "optical transmission device" may be referred to as a "node" or a "station."

A node 11 is an example of an element NE of the optical network 1 and may be, for example, a WDM node supporting transmission of the WDM light or a reconfigurable optical add-drop multiplexer (ROADM) node.

The node 11 may be connected with other node 11 by an optical transmission path so as to make optical communication possible between the nodes 11. The optical transmission path may be an optical fiber transmission path using an optical fiber. The optical network 1 may be either a mesh network in which the nodes 11 are connected with each other in a mesh shape by the optical transmission path or a ring network in which the nodes 11 are connected with each other in a ring shape.

The node 11 may be, for example, connected with a single TRP unit 12 or a plurality of TRP units 12-n. For example, a node #1 may be connected with a TRP unit (#1) 12-1. A node #2 may be connected with a TRP unit (#2) 12-2. A node #4 may be connected with any of TRP units #3, #4, and #5 12-3, 4, 5.

A node #5 may be connected with a TRP unit (#6) 12-6 and a TRP unit (#7) 12-7. A node #6 may be connected with the TRP unit (#6) 12-6 and a TRP unit (#8) 12-8.

A node #7 may be connected with a TRP unit (#9) 12-9, and a node #8 may be connected with a TRP unit (#10) 12-10. A node #9 may be connected with a TRP unit (#11) 12-11, and a node #11 may be connected with a TRP unit (#12) 12-12.

Figure 2:
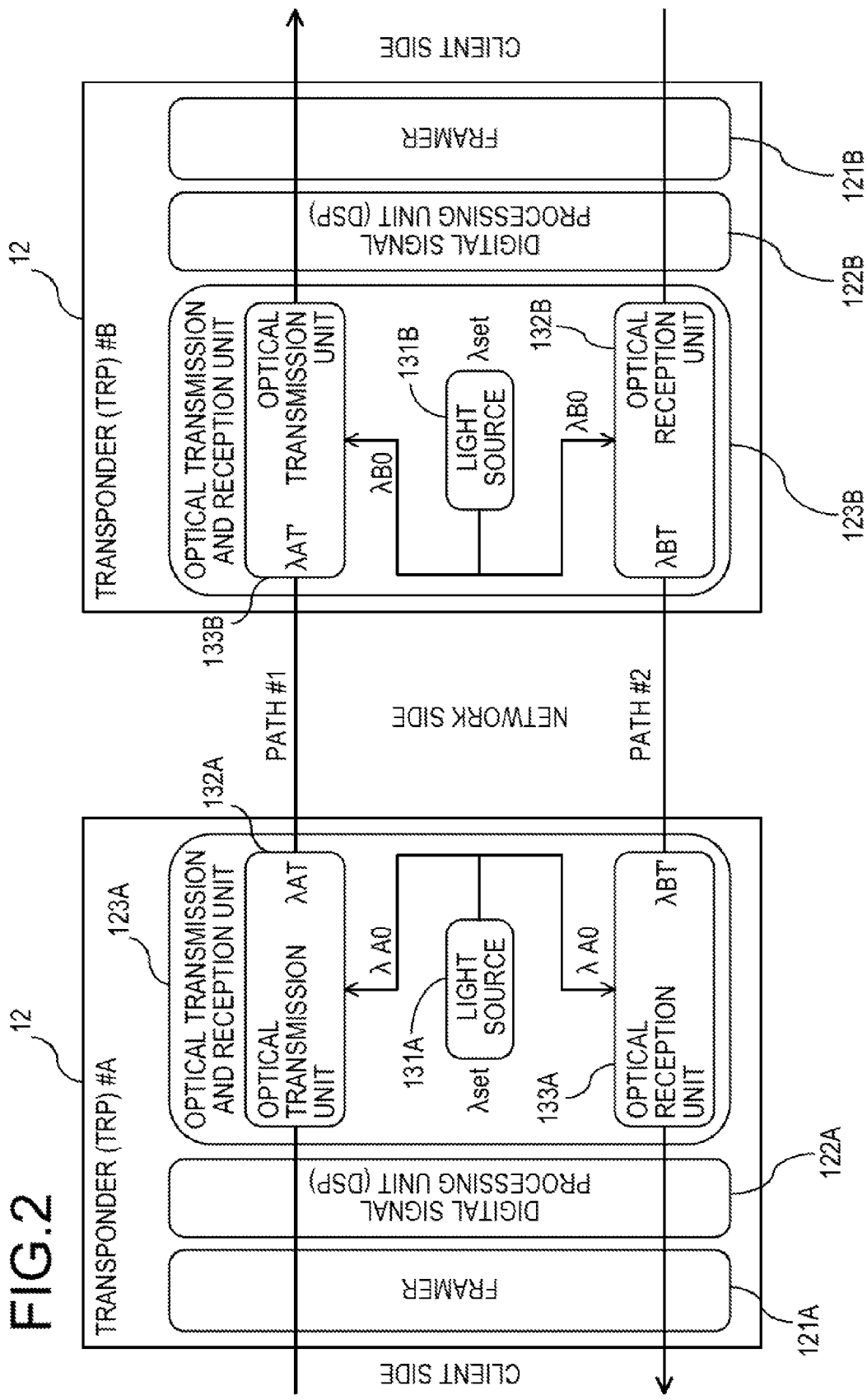
FIG. 2 is a block diagram illustrating an exemplary configuration of a transponder (TRP) unit equipped with a light source commonly used by transmission and reception, according to the embodiment.

A TRP unit #j (j is an integer of 2 or more, and j is any numbers from 1 to 12 in the example of FIG. 2) may be abbreviated as a TRP #j or a TRP 12, for the sake of convenience. The TRP 12 may be built in the node 11.

In the example of FIG. 1, the TRP #1, for example, is able to communicate with the TRP #6 through the node #1, node #2, node #3, node #4, and node #5 in this order (i.e., through nodes #1-#2-#3-#4-#5).

The TRP #2, for example, is able to communicate with the TRP #3 through the node #3.

The TRP #4, for example, is able to communicate with the TRP #8 through nodes #4-#5-TRP #6-node #6.

The TRP #9, for example, is able to communicate with the TRP #10 through the nodes #7-#8.

The TRP #11, for example, is able to communicate with the TRP #12 through nodes #9-#10-#11.

A route C passing through the nodes #2, #3, and #4 in this order, a route D passing through the nodes #7 and #8 in this order, and a route E passing through the nodes #9, #10, and #11 in this order may be set between the node #1 and the node #5.

One of the routes C, D, and E may be set as an active route, and the remaining two routes may be set as standby routes. The terms "active" and "standby" may be referred to as the terms "work" and "protection," respectively. In the example of FIG. 1, the route C corresponds to a work route, and the routes D and E correspond to protection routes for the work route C.

A single optical path or a plurality of optical paths may be set in each of the routes C, D, and E. The optical path may be identified by a wavelength. Accordingly, the "optical path" may be assumed as a "wavelength path."

For the sake of convenience, an optical path which is set in a work route may be referred to as a "work path," and an optical path which is set in a protection route may be referred to as a "protection path."

For the sake of convenience, a work path which is set in a work route C may be denoted by a "work path C," and the protection paths which are set in protection routes D and E may be denoted by a "protection path D" and a "protection path E," respectively.

When a failure or the like occurs on the work path C, the work path C may be switched to one of the protection paths D and E such that the communication over the work path C may be relieved by one of the protection paths D and E.

For example, the TRP #j is able to transmit and receive light having a plurality of wavelengths (e.g., three or more wavelengths) and may use any one of the wavelengths for communication over the work path and the remaining wavelengths for communication over the protection path. For the sake of convenience, the wavelength used for communication over the work path may be referred to as a "work wavelength" or an "active wavelength," and the wavelength used for communication over the protection path may be referred to as a "protection wavelength" or a "standby wavelength."

When an error occurs in the communication over the work path, the TRP #j may select any one of protection wavelengths and switch the work wavelength to the protection wavelength so as to relieve the communication in which the error occurs by the protection path.

According to the TRP #j capable of transmitting and receiving light having three or more wavelengths, it is possible to switch a path more flexibly and dynamically compared to a technique, such as optical unidirectional path switched ring (OUPSR), of selecting one of two wavelengths as a work wavelength.

Here, the question regarding which one of a plurality of protection wavelengths is to be selected as a new work wavelength may be determined, for example, based on signal quality in the communication for the protection wavelength. For example, a bit error rate (BER) of an available protection wavelength signal may be monitored and measured in advance prior to starting operation of an optical network 1, and then, a protection wavelength with the smallest BER may be selected as a new work wavelength. A target to be monitored for the BER may be, for example, an overhead (OH) of a signal.

However, when the BER of a signal is monitored, the monitoring time may easily be extended to become longer as the protection path requires a higher signal quality. For example, it is required to confirm whether a very small BER, for example, $10^{-9}$ (BER-9) or less or $10^{-11}$ (BER-11) or less is satisfied for a path where even a degradation of an optical signal to noise ratio (OSNR) as much as several decibels (dB) is not permitted.

Although it is possible to detect a loss of a signal (LOS) or the BER having about $10^{-6}$ (BER-6) or more in several hundred milliseconds (ms) or less, it may take several minutes or more to detect a very small BER such as BER-9 or BER-11.

Therefore, it may take a relatively long time for monitoring the signal of the protection wavelength prior to starting operation or during operation as the number of protection wavelengths used for the work wavelength increases. For example, regarding the BER-11, it may take about 100 seconds to detect the BER and about 300 seconds to recover the BER.

Therefore, it may take 500 seconds or more to monitor the BER of a single protection wavelength. When there are, for example, eight wavelengths, as a target protection wavelength for monitoring, it takes a total of about 4,000 seconds (one hour or more) to monitor the protection wavelength.

When wavelength spacing of light included in WDM light becomes narrower, in a transmission band of WDM light in order to extend the transmission capacity or efficiently use the transmission band of the WDM optical network 1, bit errors becomes easier to occur in signal light due to crosstalk of light having adjacent wavelengths. When bit errors becomes easier to occur in signal light, a monitoring time required for confirming whether the signal having the protection wavelength satisfies a predetermined BER may be further increased.

For example, since demand for the transmission capacity of a network is expected to sharply increase due to distribution of, such as Internet of Things (IoT) over the recent years, an attempt is being made to extend the transmission capacity of the WDM optical network, which is an example of a core network of the optical network 1.

An example of a method for extending the transmission capacity of the WDM optical network includes a method for increasing the transmission capacity per a single wavelength or a method for increasing the number of available wavelengths in the transmission band of WDM light (for the sake of convenience, may be referred to as a "WDM transmission band").

An increase of transmission capacity per a single wavelength may be implemented by increasing the number of transmissible bits per a single wavelength using a modulation scheme such as quadrature phase shift keying (QPSK) or quadrature amplitude modulation (QAM), a polarization multiplexing scheme, or a combination thereof.

In the meantime, an increase of the number of wavelengths in the WDM transmission band may be implemented by narrowing spacing between adjacent wavelengths (for the sake of convenience, may be referred to as wavelength spacing) in a band which is hardly affected by, such as a non-linear effect.

For example, when it is possible to multiplex 88 wavelengths into a wavelength spacing of 50 GHz in a certain WDM transmission band, the wavelength spacing may be narrowed to 6.25 GHz which is one eighth of 50 GHz such that 120 wavelengths may be wavelength multiplexed in the WDM transmission band.

However, when a wavelength spacing is narrowed, a hardware (HW) dependent error is included in setting a wavelength (or frequency) for a light source (e.g., laser) between the TRPs #j according to transmission and reception of WDM light. Therefore, the case where a wavelength spacing is narrowed requires a higher accuracy compared to a normal case where the wavelength spacing is not narrowed.

For example, regarding setting of the wavelength of the light source, only the frequency error of less than 100 MHz or less may be allowed for a case where the wavelength spacing is narrowed while a frequency error of about 500 MHz is allowed normally.

Although two light sources for transmission and reception may be provided in the TRP #j, only a single light source shared by transmission and reception may be provided in the TRP #j in order to achieve reduction of a size and costs of the TRP #j.

When the light source is shared by transmission and reception, it is not allowed that a certain frequency error accuracy is separately satisfied for transmission and reception, and it is required to satisfy the frequency error accuracy expected for both transmission and reception. Therefore, there is a concern that it takes a long time to set the wavelength of the light source. In a worst case, there is a possibility that a path to which setting of a wavelength with an expected frequency error accuracy may not be realized.

In FIG. 2, an exemplary configuration of a TRP unit equipped with a light source shared by transmission and reception is illustrated. A first TRP #A is able to perform bidirectional optical communication with a second TRP #B through optical transmission paths each of which corresponds to one of forward direction and backward direction communications. Illustratively, the TRP #A may correspond to TRP #1 illustrated in FIG. 1, and the TRP #B may correspond to TRP #6 illustrated in FIG. 1.

The TRP #A illustratively may include a framer 121A, a digital signal processing unit (DSP) 122A, and an optical transmission and reception unit 123A. The optical transmission and reception unit 123A illustratively may include a light source 131A, an optical transmission unit 132A, and an optical reception unit 133A.

The framer 121A illustratively maps a signal received from, for example, a synchronous digital network such as SDH or SONET or the Ethernet (registered trademark) into a frame signal to be transmitted to the optical transmission path. The "SDH" is an abbreviation for the "synchronous digital hierarchy," and the "SONET" is an abbreviation for the "synchronous optical network."

The synchronous digital network or the Ethernet may be referred to as a client network or a tributary network with respect to the optical network 1 which is an example of a core network. The signal transmitted through the client network (or tributary network) may be referred to as the client signal (or tributary signal).

In the optical network 1 which is an example of a core network, signal light transmitted through the optical transmission path illustratively may have a frame format of an optical transport network (OTN). The signal light with an OTN frame format, for the sake of convenience, may be referred to as an OTN frame or an OTN signal.

The framer 121A may map the client signal received from the client network into the OTN frame. For example, the client signal may be mapped into a tributary slot (TS) which is an example of a time slot of the OTN frame.

The framer 121A may demap the client signal mapped into the OTN frame received from the optical transmission path. The demapped client signal may be transmitted to another client network according to the reception destination of the client signal.

A digital signal processor (DSP) 122A is an example of an operation device equipped with an operation capability. The operation device may be referred to as a "processor device" or a "processor circuit." The DSP 122A illustratively performs digital signal processing on the frame signal transmitted to and received from the framer. The digital signal processing may include either or both of transmission digital signal processing and reception digital signal processing.

The transmission digital signal processing may include processing such as, for example, pre-equalization or waveform shaping of the transmission frame signal. Electric signal according to the frame signal subjected to the transmission digital signal processing illustratively may be used in the driving signal for an optical modulator (which will be described later) provided in an optical transmission unit 132A.

The reception digital signal processing may include illustratively processing such as, for example, adaptive equalization or error correction decoding. Wavelength dispersion (chromatic dispersion: CD), polarization mode dispersion (PMD), polarization dependent loss (PDL), and a nonlinear effect that are degradation factors of reception characteristic of signal light transmitted through the optical may be numerically calculated and compensated by the reception digital signal processing.

In the optical transmission and reception unit 123A, the light source 131A emits and outputs light having a setting wavelength of λset. The output light of the light source 131A may be referred to "local light." The local light may be used for an optical modulation in the optical transmission unit 132A and coherent detection in the optical reception unit 133A. Illustratively, a semiconductor laser diode (LD) may be applied to the light source 131A, and a tunable LD having a variable output wavelength may be applied to the LD.

The optical transmission unit 132A illustratively includes an optical modulator (not illustrated), and the driving signal generated by transmission digital signal processing in the DSP 122A is input to the optical modulator. The optical modulator illustratively modulates the output light of the light source 131A according to the driving signal to generate a modulated signal light for transmission and transmits the modulated signal light to the optical transmission path (path #1 in an example of FIG. 2) connected to the TRP #.

The optical reception unit 133A illustratively mixes local light of the light source 131A to the modulated signal light received from an optical path (path #2 in an example of FIG. 2) connected to the TRP #B by, for example, a 90-degree hybrid phase mixer to conduct coherent detection on the modulated signal light for reception.

Light having a wavelength of interest for reception (may be referred to as "desired reception wavelength") is extracted and demodulated in the optical reception unit 133A by coherent detection. The demodulated signal light is converted to electrical signal and is subjected to the reception digital signal processing in the DSP 122A.

When the reception signal light is a polarization multiplexed signal light obtained by being subjected to a scheme such as DP-QPSK or DP-QAM, the reception signal light may be mixed with local light for each of two different polarization components using the 90-degree phase hybrid mixer in the optical reception unit 133A.

With this, signal light (XI, XQ, YI, YQ) are demodulated using a total of four routes (may be referred to as "lane") of an in-phase (I) component and a quadrature (Q) component regarding two different polarization components (X, Y). The "DP-QPSK" is an abbreviation for the "dual polarization-quadrature phase shift keying," and the "DP-QAM" is an abbreviation for the "dual polarization-quadrature amplitude modulation."

Each of signal light of four lanes may be received by, for example, a PD (photo-detector or photodiode) and converted to each of electrical signals (EXI, EXQ, EYI, EYQ) depending on a received light power.

Electrical signals (EXI, EXQ, EYI, EYQ) of four lanes may be input to the DSP 122A. The DSP 122A performs digital signal processing on the input electrical signals (EXI, EXQ, EYI, EYQ) of four lanes.

A configuration of the TRP #B may be the same as that of the TRP #A described above. Illustratively, the TRP #B may be provided with a framer 121B, a digital signal processing unit (DSP) 122B, and an optical transmission and reception unit 123B. The optical transmission and reception unit 123B, illustratively, may be provided with a light source 131B, an optical transmission unit 132B, and an optical reception unit 133B.

Functionalities of the framer 121B, the DSP 122B, and the optical transmission and reception unit 123B may be the same as or similar to those of the framer 121A, the DSP 122A, and the optical transmission and reception unit 123A of the TRP #A.

Functionalities of the light source 131B, the optical transmission unit 132B, and the optical reception unit 133B in the optical transmission and reception unit 123B may be also the same as or similar to those of the light source 131A, the optical transmission unit 132A, and the optical reception unit 133A in the optical transmission and reception unit 123A of the TRP #A.

For that reason, in a case where elements of the TRP #A and the TRP #B do not need to clarify, the elements may be described by omitting the reference symbol of "A" and "B." For example, the framer 121A and the framer 121B may be abbreviated as the framer 121. The abbreviation may be similarly applied to other elements.

Setting of a wavelength λset of local light output by each of the light sources 131 of the TRP #A and the TRP #B illustratively may be performed by a network manager (may be referred to as an operator or a user).

For example, the operator may set the wavelength λset of the light source 131 by the NMS or OPS capable of performing centralized managing and control on the operations of each node 11 in the optical network 1. The "NMS" is an abbreviation of a "network management system," and the "OPS" is an abbreviation of an "operation system." Otherwise, the operator may perform setting of the wavelength λset of the light source 131 in each node 11.

Here, the light source 131 intends to output local light having the set wavelength λset but a wavelength actually output may be offset from the set wavelength λset due to the individual amount of variation in LDs.

For the sake of convenience, it is assumed that the wavelength, which is actually input to the optical transmission unit 132A and the optical reception unit 133A from the light source 131A is "λA0" in the TRP #A. Also, it is assumed that the wavelength, which is actually input to the optical transmission unit 132B and the optical reception unit 133B from the light source 131B is "λB0" in the TRP #B.

A wavelength "λAT" transmitted from the optical transmission unit 132A to the path #1 may be changed to "λAT'" upon receiving by the TRP #B due to the individual amount of variation in optical transmission units 132A or the individual amount of variation in optical transmission paths of the path #1.

For that reason, the wavelength "λAT'" actually received from the path #1 in the optical reception unit 133B of the TRP #B may be a wavelength different from the wavelength "λB0" of local light which is actually input to the optical reception unit 133B from the light source 131B. The reception wavelength "λAT'" of the path #1 may differ from the set wavelength "λset" of the local light.

The matters described are similar to the path #2 directing in a reverse direction of the path #1. For example, the wavelength "λBT" actually received from the path #2 in the optical reception unit 133A of the TRP #A may be a wavelength different from the wavelength "λA0" of local light which is actually input to the optical reception unit 133A from the light source 131A. Further, the reception wavelength "λBT" of the path #2 may differ from the set wavelength "λset" of the local light.

When it is intended to make the reception wavelength "λAT'" of the path #1 coincident with the wavelength "λB0" of local light, the set wavelength "λset" of the local light needs to be adjusted. Regarding the path #2, when it is intended to make the reception wavelength "λBT" coincident with the wavelength "λA0" of local light, the set wavelength "λset" of the local light needs to be adjusted.

However, since the local light is shared by transmission and reception, when the set wavelength λset of local light is changed, the wavelengths, which are input to both the optical transmission unit 132 and the optical reception unit 133, of local light are respectively changed in both the TRP #A and TRP #B. For that reason, it is difficult to make the reception wavelength coincident with the wavelength of local light with high accuracy regarding both of the path #1 and the path #2.

Figure 3:
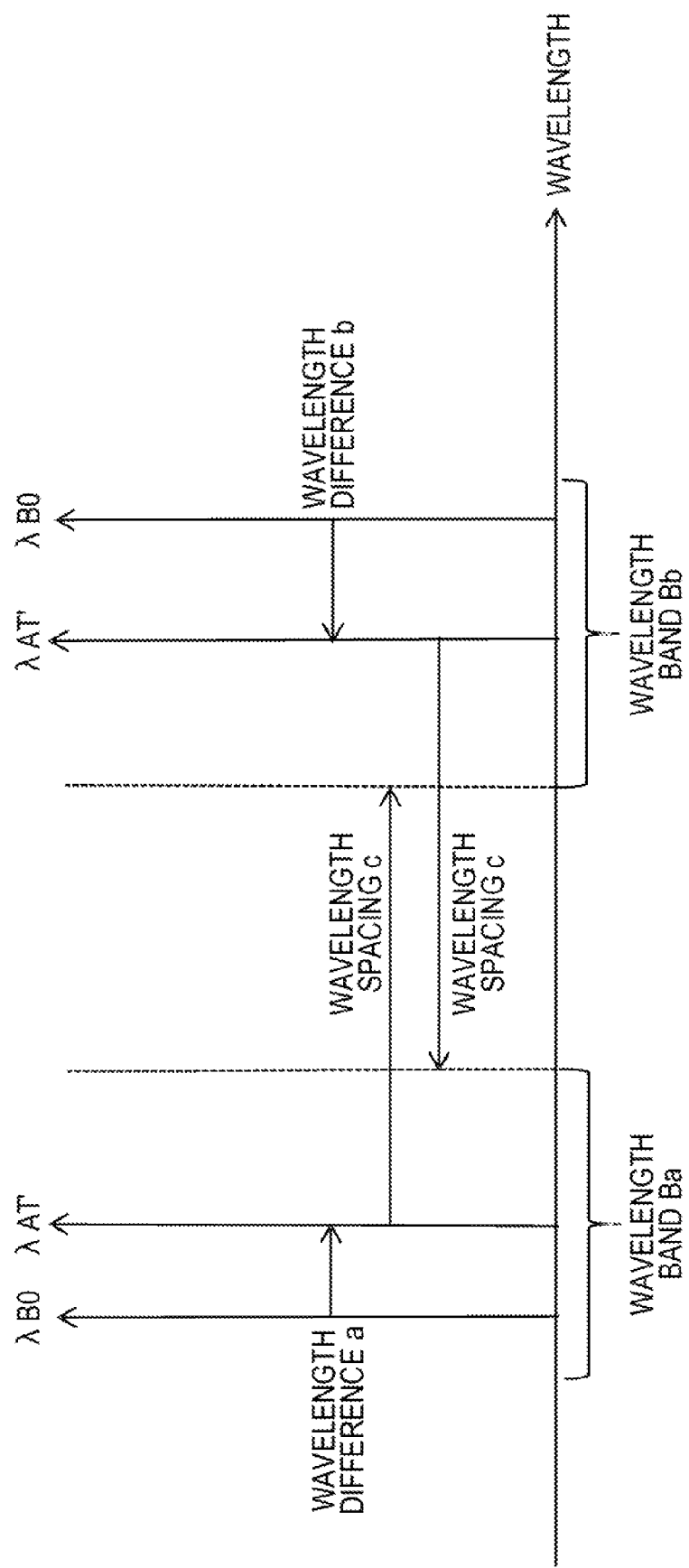
FIG. 3 is a diagram for explaining a concept of a wavelength difference according to a frequency offset between a reception wavelength and local light in the TRP unit exemplified in FIG. 2.

As schematically illustrated in FIG. 3, a wavelength spacing c with respect to an adjacent wavelength band Ba or Bb becomes small as wavelength differences a and b between the reception wavelength "λAT'" (or "λBT'") and wavelength "λB0" (or "λA0") of the local light are increased.

For example, in a case where the wavelength λB0 of the local light is set in the wavelength band Ba of a short wavelength side, when the reception wavelength λAT' is offset to a long wavelength side with respect to the wavelength λB0 of the local light, the wavelength spacing c with respect to the wavelength band Bb of the long wavelength side is decreased.

In a case where the wavelength λB0 of the local light is set in the wavelength band Bb of the long wavelength side, when the reception wavelength λAT' is offset to the short wavelength side with respect to the wavelength λB0 of the local light, the wavelength spacing c with respect to the wavelength band Ba of the short wavelength side is decreased.

In FIG. 3, other wavelength band may be allocated for transmission of signal light in a shorter wavelength side of the wavelength band Ba, or other wavelength band may be allocated for transmission of signal light in a longer wavelength side of the wavelength band Bb.

In other words, a separate wavelength band may exist in both the short wavelength side and the long wavelength side in any of the wavelength band Ba and the wavelength band Bb. In this case, even when the reception wavelength λAT' is offset to any of the long wavelength side and the short wavelength side, the wavelength spacing c with respect to the adjacent wavelength band is decreased.

When the wavelength spacing c is decreased, it becomes easy for noise caused by wavelength crosstalk between signal light to increase, and as a result, the BER of signal light is easily decreased. When the BER is decreased, it becomes easy for the monitoring time of the protection wavelength satisfying an expected BER to extend, as described above.

For that reason, it is required to select a wavelength of which the spacing c with respect to the adjacent wavelength in WDM light is as large as possible, for the protection wavelength. An example of a wavelength spacing monitoring scheme may include a scheme in which the NMS or the OPS collects information of a wavelength included in WDM light transmitted through the optical network 1 from each TRP 12 regularly or irregularly to calculate the wavelength spacing.

Otherwise, it may also be considered a scheme in which instead of the NMS or the OPS, the TRPs 12 related to transmission and reception of the WDM light transmit and receive the wavelength information with each other, and the TRP 12 or the node 11 to which the TRP 12 is connected calculates the wavelength spacing.

However, in the wavelength spacing calculation scheme, since wavelength information of the entire optical network 1 is acquired in such a way that a wavelength available in a certain node 11 is added or deleted in the wavelength information, a quantity of processing related to the wavelength spacing calculation is increased as a scale of the optical network 1 becomes large.

When countermeasures for a case where addition or deletion of a wavelength occurs or a case where an error occurs in communication for acquiring the wavelength information are taken into account, a scheme for monitoring is likely to be complicated.

Furthermore, in order to detect (or identify) and monitor the BER of the OTN signal to monitor, functionality of the OTU or the ODU layer depending on a transmission capacity such as, for example, 40 Gbp, 100 Gbps, or 400 Gbps is to be installed on the TRP 12 or the node 11, and thus, cost increases. The "OTU" is an abbreviation for the "optical channel transport unit," and the "ODU" is an abbreviation for the "optical channel data unit."

In the present embodiment, even though the BER of reception signal light is not monitored and detected, each TRP 12 is allowed to select a protection wavelength having a relatively small wavelength difference between the wavelength actually received and the set wavelength λset of local light. With this, it is possible to shorten the monitoring time for the protection wavelength and also achieve reduction of network costs.

Figure 4:
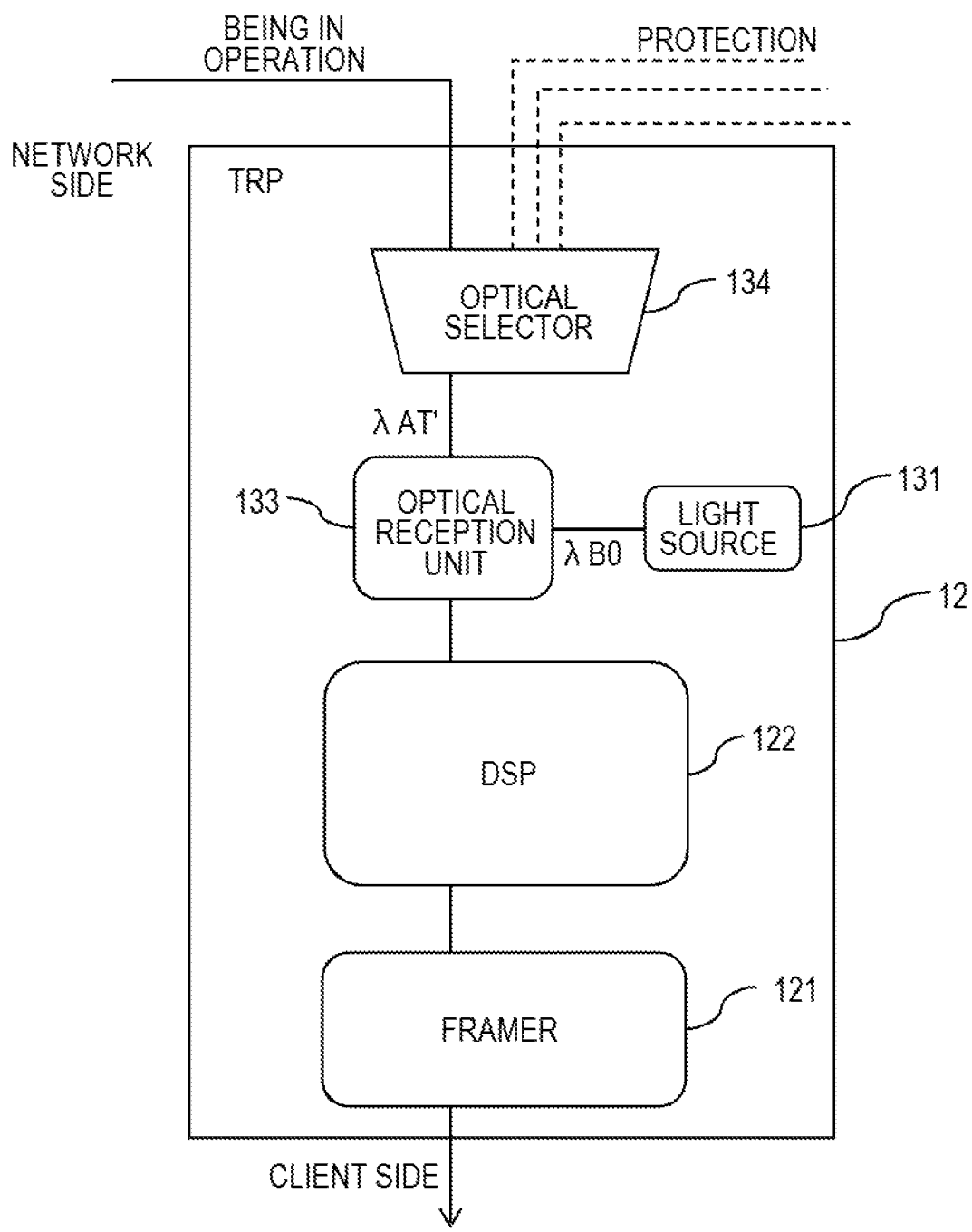
FIG. 4 is a block diagram illustrating an exemplary configuration of a TRP unit according to the embodiment.

In FIG. 4, an exemplary configuration of the TRP 12 according to an embodiment is illustrated. The TRP 12 illustrated in FIG. 4, illustratively, may include an optical selector 134 in addition to the framer 121, the DSP 122, the light source 131, and the optical reception unit 133 described above. In FIG. 4, it may be recognized that the optical transmission unit 132 illustrated in FIG. 4 is omitted.

The optical selector 134 selectively outputs any of a plurality of wavelengths included in WDM light to the optical reception unit 133. The optical selector 134 may be a wavelength select switch (WSS). The wavelength selected by the optical selector 134, illustratively, may be controlled by the DSP 122. For example, when a wavelength is in an operating state, a work wavelength is selected by the optical selector 134, and when a failure has occurred in a work wavelength, a certain protection wavelength is selected by the optical selector 134.

Figure 5:
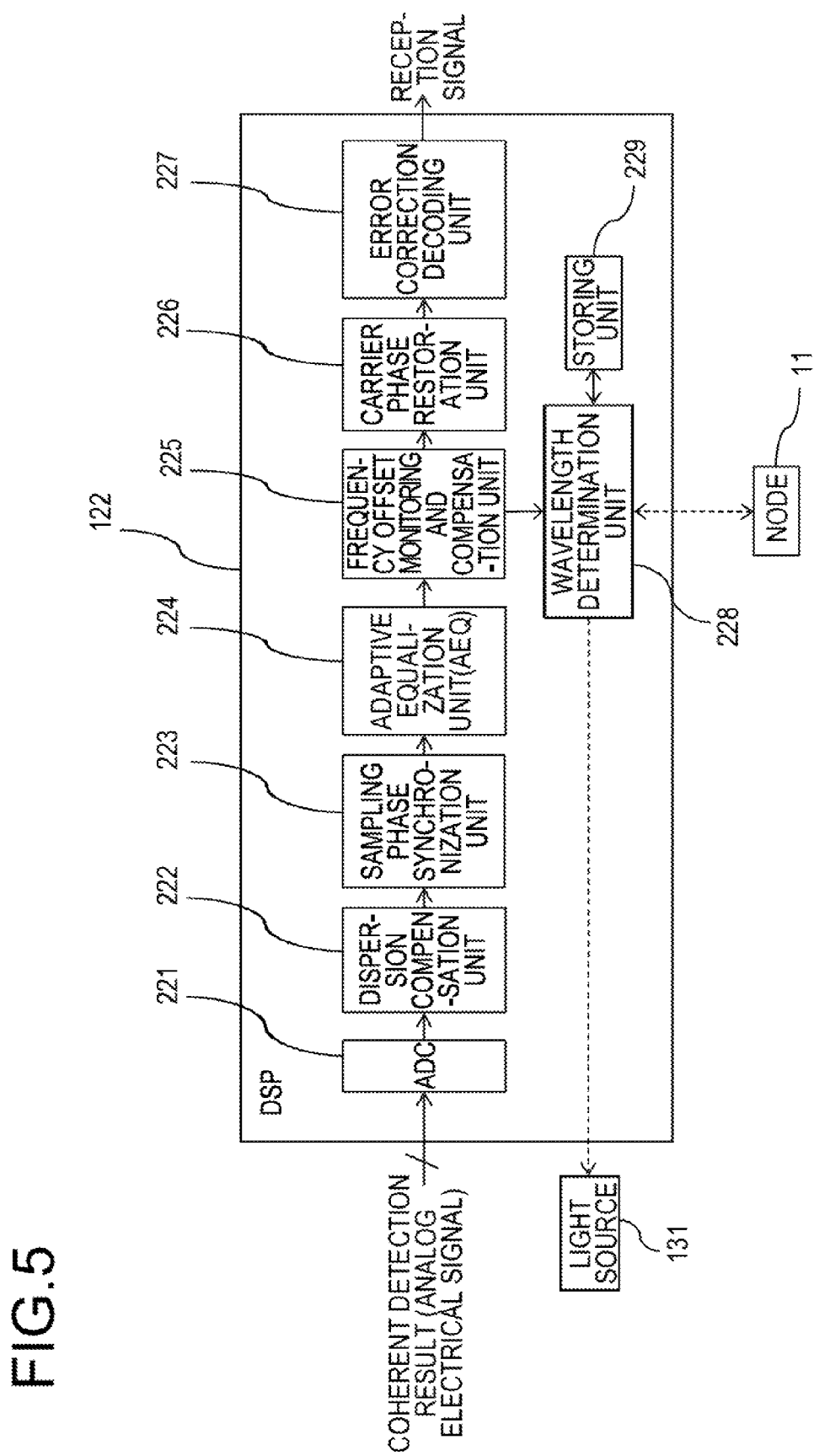
FIG. 5 is a block diagram illustrating an exemplary configuration of a digital signal processing unit exemplified in FIG. 4.

The DSP 122, for example, as illustrated in FIG. 5, may be provided with an analog-digital converter (ADC) 221, a dispersion compensation unit 222, a sampling phase synchronization unit 223, and an adaptive equalization unit (AEQ) 224. Further, the DSP 122, illustratively, may be provided with a frequency offset monitoring and compensation unit 225, a carrier phase restoration unit 226, an error correction decoding unit 227. The DSP 122, illustratively, may be provided with a wavelength determination unit 228 and a storing unit 229. In the meantime, the "AEQ" is an abbreviation for an "Adaptive Equalizer."

The ADC 221 performs digital sampling on an analog electrical signal corresponding to signal light demodulated by the coherent detection in the optical reception unit 133 to convert the analog electrical signal into a digital electrical signal. When the signal light is polarization modulated signal light, as described above, the signal light (XI, XQ, YI, YQ) of the in-phase (I) component and the quadrature (Q) component is demodulated regarding each of two different polarization components (X, Y) in the reception unit 133.

For that reason, the electrical signal (EXI, EXQ, EYI, EYQ) corresponding to the signal light of four lanes is input to the ADC 221. The ADC 221 may be shared by respective lanes or separately provided to the lanes.

Analog waveform information including phase information is quantized into a digital value by the digital sampling in the ADC 221. As such, the analog waveform information is converted into the digital value such that it becomes possible to conduct various characteristics compensation with operation processing for the digital value.

The dispersion compensation unit 222, illustratively, conducts the wavelength dispersion compensation for each polarization component with respect to the digital electrical signal input from the ADC 221. A digital filter such as a transversal filter modeling a waveform distortion due to the wavelength dispersion may be applied to the wavelength dispersion compensation.

The sampling phase synchronization unit 223 conducts processing for optimizing digital sampling timing (in other words, frequency and phase) in the ADC 221. In the sampling timing optimization, for example, the sampling timing may be synchronized with a center of a data pulse.

The AEQ 224, illustratively, may be provided with a finite impulse response (FIR) filter which is an example of the digital filter. The FIR filter, for the sake of convenience, may be referred to as an "AEQ filter." The AEQ 224, for the sake of convenience, may be referred to as the AEQ filter 224.

The FIR filter coefficient is adaptively updated at a speed significantly higher than, for example, polarization fluctuation of signal light such that the waveform distortion caused by the polarization fluctuation or polarization mode dispersion (PMD) may be adaptively equalized to be compensated. The FIR filter coefficient is an example of a filter parameter, and for the sake of convenience, the FIR filter coefficient may be referred to as a "filter coefficient", a "tap coefficient," or an "equalization weight."

A constant modulus algorithm (CMA) may be adopted as an example of a method (which may be referred to as an "algorithm") for adaptively controlling the tap coefficient of the FIR filter. In the CMA, the tap coefficient is adaptively updated such that an absolute value of complex amplitude becomes constant.

The frequency offset monitoring and compensation unit 225, illustratively, monitors the frequency offset between the reception signal light and local light to be compensated based on the output signal of the AEQ 224. The "monitoring" may be referred to as an "estimation," a "measurement," or a "detection." The frequency offset monitoring and compensation unit 225 may be abbreviated as the "frequency offset monitor 225" or the "monitor 225." In the meantime, the frequency offset monitoring and compensation unit 225 may be recognized as an example of a "monitor" to monitor the frequency offset.

For example, an estimation method called an exponentiation method or an estimation method called pre-decision based angle differential frequency offset estimator (PADE) method capable of extending an estimable range to be larger than the exponentiation, illustratively, may be applied in the frequency offset estimation.

The information (for the sake of convenience, may be referred to as a "frequency offset monitor information") of the frequency offset monitored in the frequency offset monitor 225, illustratively, may be provided to the wavelength determination unit 228. It may be recognized that the frequency offset monitor information corresponds to information indicating the wavelength differences a and b illustrated in FIG. 3.

The carrier phase restoration unit 226 removes a noise component from the received digital signal in which the frequency offset is compensated in the frequency offset monitoring and compensation unit 225, estimates a correct carrier phase, and make the phase of the received digital signal synchronized with the estimated carrier phase. For example, amplified spontaneous emission (ASE) noise or laser phase noise may be included in the noise component.

A feedback method in which influence by noise is removed using a digital loop filter or a feed-forward method in which influence by noise is removed by averaging the estimated phase differences detected by a phase detector, illustratively, may be applied to the carrier phase estimation.

The error correction decoding unit 227 conducts error correction decoding on the received digital signal based on the error correction code added to the transmitting signal by, for example, digital signal processing. Illustratively, a low-density parity-check code (LDPC) or a forward error correction (FEC) code may be applied to the error correction code. The BER of the reception signal light, illustratively, is capable of being detected in the error correction decoding unit 227.

The wavelength determination unit 228, illustratively, may preferentially select the wavelength of which the wavelength spacing c of FIG. 3 is relatively increased and determine the selected wavelength as a protection wavelength for a switching destination of a work wavelength, based on the information of the frequency offset monitored in the frequency offset monitor 225. In the meantime, the wavelength determination unit 228 may be recognized as an example of a "controller" to select the protection wavelength.

The wavelength of which the wavelength spacing c of FIG. 3 is relatively increased may be recognized as a wavelength that the wavelength difference according to the frequency offset between the wavelength actually received and the wavelength of local light is relatively small.

The storing unit 229, illustratively, may store frequency offset monitor information monitored in the monitor 225. Illustratively, a random access memory (RAM) or a flash memory may be applied to the storing unit 229.

First Embodiment

Hereinafter, descriptions will be made on an example of selection and determination of a protection wavelength based on a frequency offset as an example of operation (first embodiment) of the optical network 1 described above with reference to FIG. 6 and FIG. 7. A frequency offset monitoring may be conducted prior to starting operation of an optical network 1. For example, prior to starting operation of an optical network 1, test signal light for a communication test may be transmitted to the optical network 1 to monitor a frequency offset of the test signal light.

Figure 6:
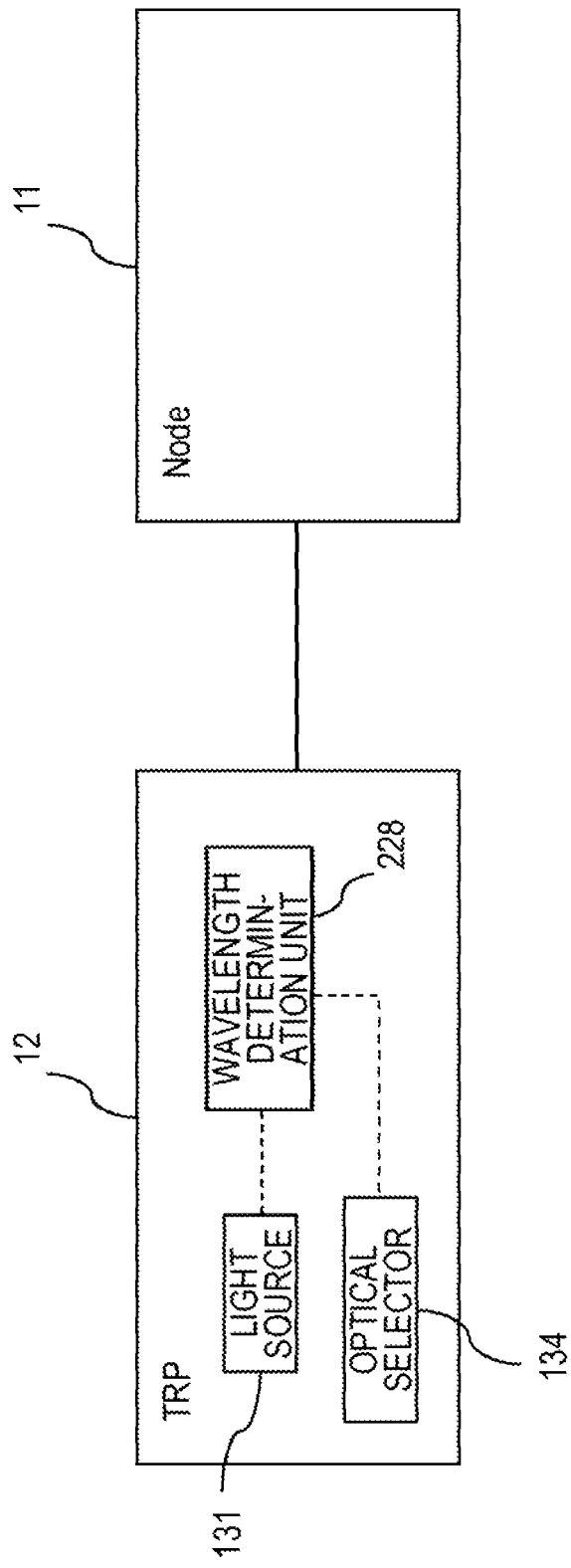
FIG. 6 is a block diagram illustrating a configuration obtained by paying attention to a certain node and a TRP unit exemplified in FIG. 1.

FIG. 6 is a block diagram illustrating an exemplary configuration obtained by paying attention to a certain node 11 and a TRP 12 connected to the node 11 and for the sake of convenience, schematically illustrates a view in which the light source 131, the optical selector 134, and the wavelength determination unit 228 described above are provided in the TRP 12.

The TRP 12 may select and determine a protection wavelength for a switching destination of a work wavelength based on the frequency offset monitored in the frequency offset monitor 225 by the wavelength determination unit 228, and notify the node 11 of the determined protection wavelength.

In the following, for convenience of explanation, it is assumed that the node 11 of FIG. 6 illustratively corresponds to the node #5 of FIG. 1, and the TRP 12 of FIG. 6 corresponds to the TRP #6 of FIG. 1. Also, descriptions will be made on an example where a frequency offset of two wavelengths for protection paths D and E with respect to a work path C is monitored in the TRP #6.

A wavelength allocated to the work path C may be denoted by a "work wavelength C" or simply denoted by a "wavelength C," and wavelengths allocated to the protection paths D and E may be denoted by either "protection wavelength D and E" or simply denoted by "wavelength D and E."

Figure 7:
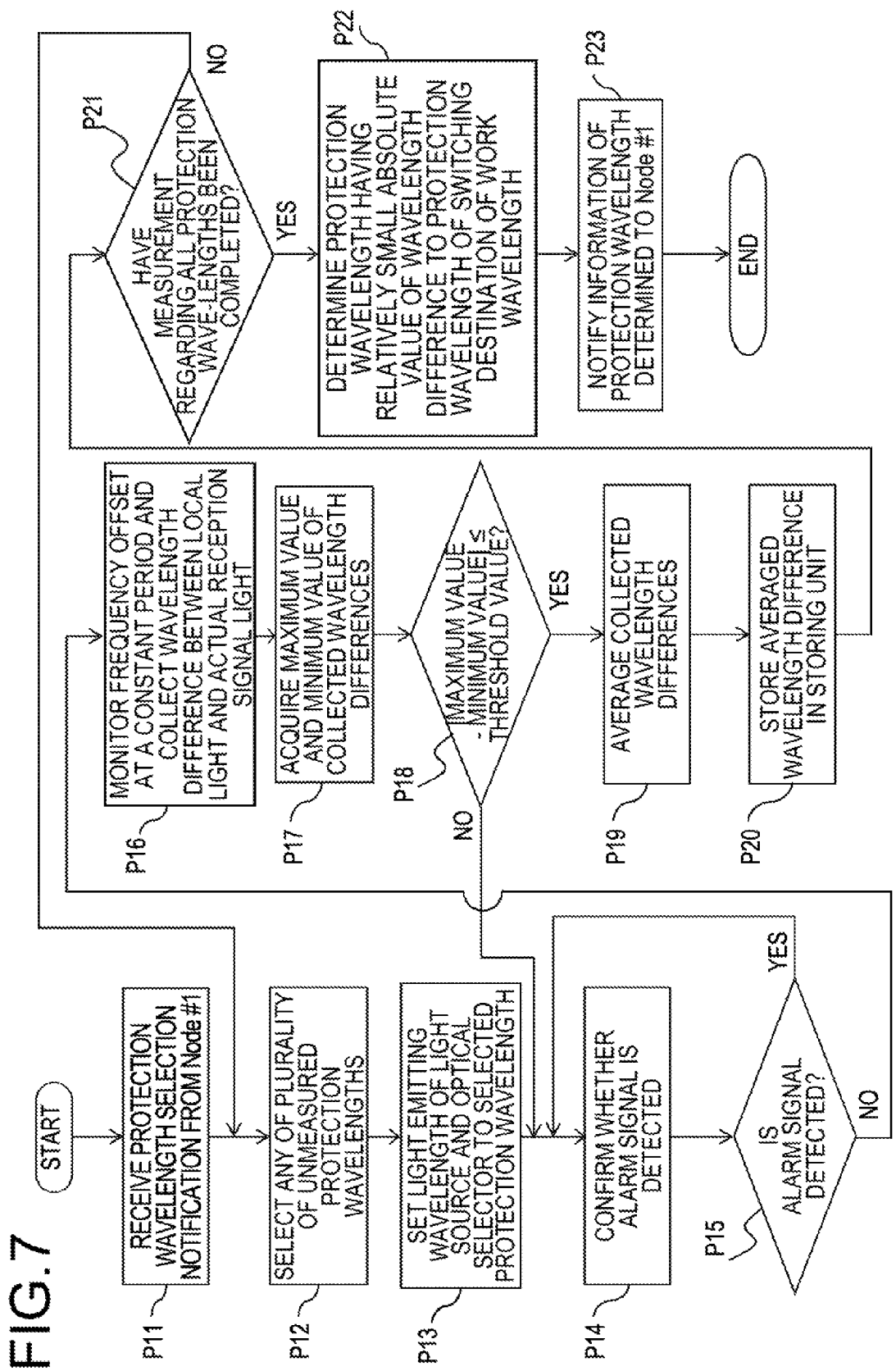
FIG. 7 is a flowchart for explaining an example of selection and determination of a protection wavelength based on a frequency offset according to a first embodiment.

As illustrated in FIG. 7, the TRP 12 (e.g., wavelength determination unit 228) receives a notification, which prompts to select a protection wavelength of which the frequency offset is to be measured, from the node 11 (Operation P11). The notification, for the sake of convenience, may be referred to as a "protection wavelength selection notification."

The protection wavelength selection notification, illustratively, may be notified from the node 11 to the TRP 12 in accordance with conducting of control regarding the protection wavelength selection on the node by, for example, the NMS, the OPS, or the operator terminal. Illustratively, the local area network (LAN) may be applied to a connection for enabling the notification between the node 11 and the TRP 12.

The TRP 12 may select one (e.g., wavelength D) of plurality of protection wavelengths of which the frequency offset is unmeasured as a frequency offset measuring target (Operation P12).

A measuring target selection policy may be a policy to preferentially select a shorter wavelength or a longer wavelength or a policy to randomly select a wavelength. Whether the frequency offset is unmeasured or not may be determined by confirming whether the frequency offset monitor information of the wavelength has been stored in the storing unit 229 or not.

The TRP 12 illustratively may set a light emitting wavelength of the light source 131 to the wavelength D selected as the measuring target and control the light emitting wavelength according to the selection of a measuring target wavelength D. Also, the TRP 12 may set a wavelength allowed to pass through the optical selector 134 to the wavelength D selected as the measuring target and control the wavelength (Operation P13).

Thereafter, the TRP 12 may confirm whether an alarm signal indicating that signal light is not able to be normally received is detected (Operations P14 and P15).

The alarm signal, illustratively, is generated by the DSP 122 according to detection of the LOL or detection of the loss of synchronization of the reception signal light. In a case of the DP-QPSK, illustratively, the loss of synchronization of the reception signal light is detected under a state where signal of four lanes is being in a loss of synchronization.

When it is determined that the alarm signal is detected ("YES" at Operation P15), the TRP 12 waits until the alarm signal is released.

When the release of the alarm signal is confirmed ("NO" at Operation P15), the TRP 12 monitors the frequency offset between the reception signal light having passed through the optical selector 134 and the local light and collects wavelength differences, by the frequency offset monitor 225 (Operation P16).

A monitor period of a frequency offset, illustratively, may be a constant period, for example, 10 ms (millisecond) to 100 ms. When the monitor period is set to a too short period, a measurement error may be increased, and thus, the monitor period may be set in an appropriated period within an allowable range.

The TRP 12, illustratively, may acquire the maximum value and the minimum value of the wavelength differences obtained during the monitor period (Operation P17), and check whether an absolute value of a difference between the maximum value and the minimum value of the wavelength difference is less than or equal to a predetermined threshold value (Operation P18).

When it is determined that the absolute value exceeds the threshold value ("NO" at Operation P18), the TRP 12 may determine that variation in the wavelength difference obtained during the monitor period is too large and thus reliability of the monitored result is low. According to the determination, the TRP 12 may return to Operation P14 and subsequent operations and perform the wavelength difference measurement again.

The alarm confirmation processing (P14 and P15) described above may be optional processing. Either one or both of the reliability confirmation processing (Operations P17 and P18) and the averaging process (P19) regarding the wavelength difference may also be optional processing.

In the meantime, when the absolute value of the difference between the maximum value and the minimum value of the wavelength differences is less than or equal to the threshold value ("YES" at Operation P18), the TRP 12 may average the wavelength differences obtained during the monitor period (Operation P19) and store the averaged wavelength difference in the storing unit 229 (Operation P20).

Thereafter, the TRP 12 may check whether the wavelength difference measurements regarding all protection wavelengths (e.g., wavelengths D and E) have been completed (Operation P21).

When it is determined that the wavelength difference measurements for all protection wavelengths have not been completed ("NO" at Operation P21), the TRP 12 may return to Operation P12, select an unmeasured protection wavelength (e.g., wavelength E) as a wavelength to be measured, and then, perform the processing of Operation P13 and subsequent operations.

When it is determined that the wavelength difference measurements for all protection wavelengths have been completed ("YES" at Operation P21), the TRP 12 may select and determine a protection wavelength for a switching destination of the work wavelength C based on information of the storing unit 229.

For example, the TRP 12 may select and determine the wavelength (D or E) having a relatively small absolute value (the minimum value as one non-limiting example) of the wavelength difference as the protection wavelength for the switching destination of the work wavelength C (Operation P22).

The TRP 12 may notify the information of the determined protection wavelength to the node 11 which is a transmission source of the protection wavelength selection notification according to the selection and determination of the protection wavelength (Operation P23).

With this, when a failure has occurred on the work path C, the node 11 is able to switch the work wavelength C to the protection wavelength having a relatively small absolute value of the wavelength difference and notified from the TRP 12.

The protection wavelength having a relatively small absolute value of the wavelength difference may be regarded as a wavelength which is hard to be affected by noise caused by wavelength crosstalk and at which the quality of signal light (e.g., BER) is hard to be lowered.

The protection wavelength monitoring time may be shorter than a time required for monitoring the BER because the protection wavelength monitoring just needs to monitor the frequency offset. For example, a time of about 100 ms makes it possible to sufficiently monitor the protection wavelength.

It becomes able to select and determine the protection wavelength having a better signal quality than a case of monitoring the BER.

It is possible to achieve reduction of a time taken until a work path in which a failure has occurred is switched to a protection path having a good signal quality.

As a result, even when a path switching time limit (e.g., 50 ms) is present, it becomes easy to satisfy the time limit.

Second Embodiment

Next, descriptions will be made on an example of selection and determination of a protection wavelength based on a frequency offset according to a second embodiment with reference to FIG. 8 and FIG. 9.

In the first embodiment described above, the frequency offset monitoring is performed regarding all available protection wavelengths prior to starting operation of the optical network 1, and one protection wavelength which becomes a switching destination of a work wavelength is selected and determined.

In contrast, in the second embodiment, illustratively, prior to starting operation of the optical network 1, the number Nc of protection wavelengths to be regarded again as a candidate for a frequency offset measurement after starting operation of the optical network 1 is narrowed down to a number less than the number Nall of all available protection wavelengths. In the meantime, the Nc and the Nall are integer numbers of two or more satisfying Nc<Nall.

Figure 8:
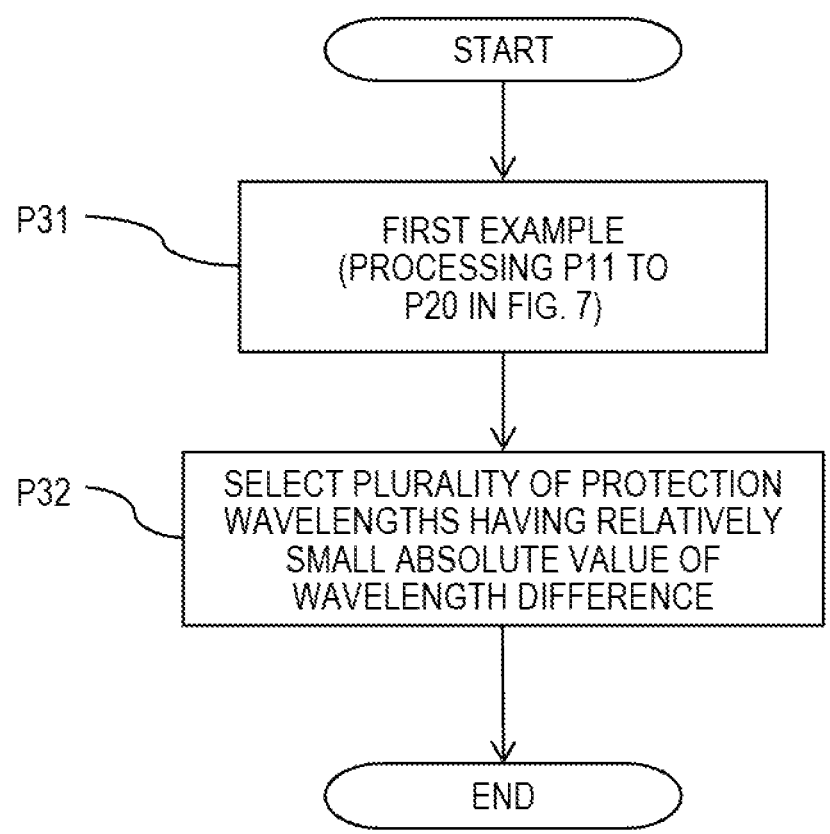
FIG. 8 is a flowchart for explaining an example of selection and determination of a protection wavelength based on a frequency offset according to a second embodiment.

As illustrated in FIG. 8, the TPR 12, prior to starting operation of the optical network 1, may perform Operations P11 to P20 illustrated in FIG. 7 in the first embodiment and perform the frequency offset measurement regarding Nall protection wavelengths (Operation P31).

The TRP 12 may select a plurality of protection wavelengths (Nc protection wavelengths) having a relatively small absolute value of the wavelength difference as the candidate for a frequency offset measurement after starting operation (Operation P32) based on, for example, the information stored in the storing unit 229 at Operation P20.

The TRP 12 may perform the frequency offset measurement regarding Nc protection wavelengths narrowed down previously and select a wavelength having a relatively small wavelength difference as the protection wavelength of switching destination according to, for example, detection of the failure of the work path after starting operation of the optical network 1.

Figure 9:
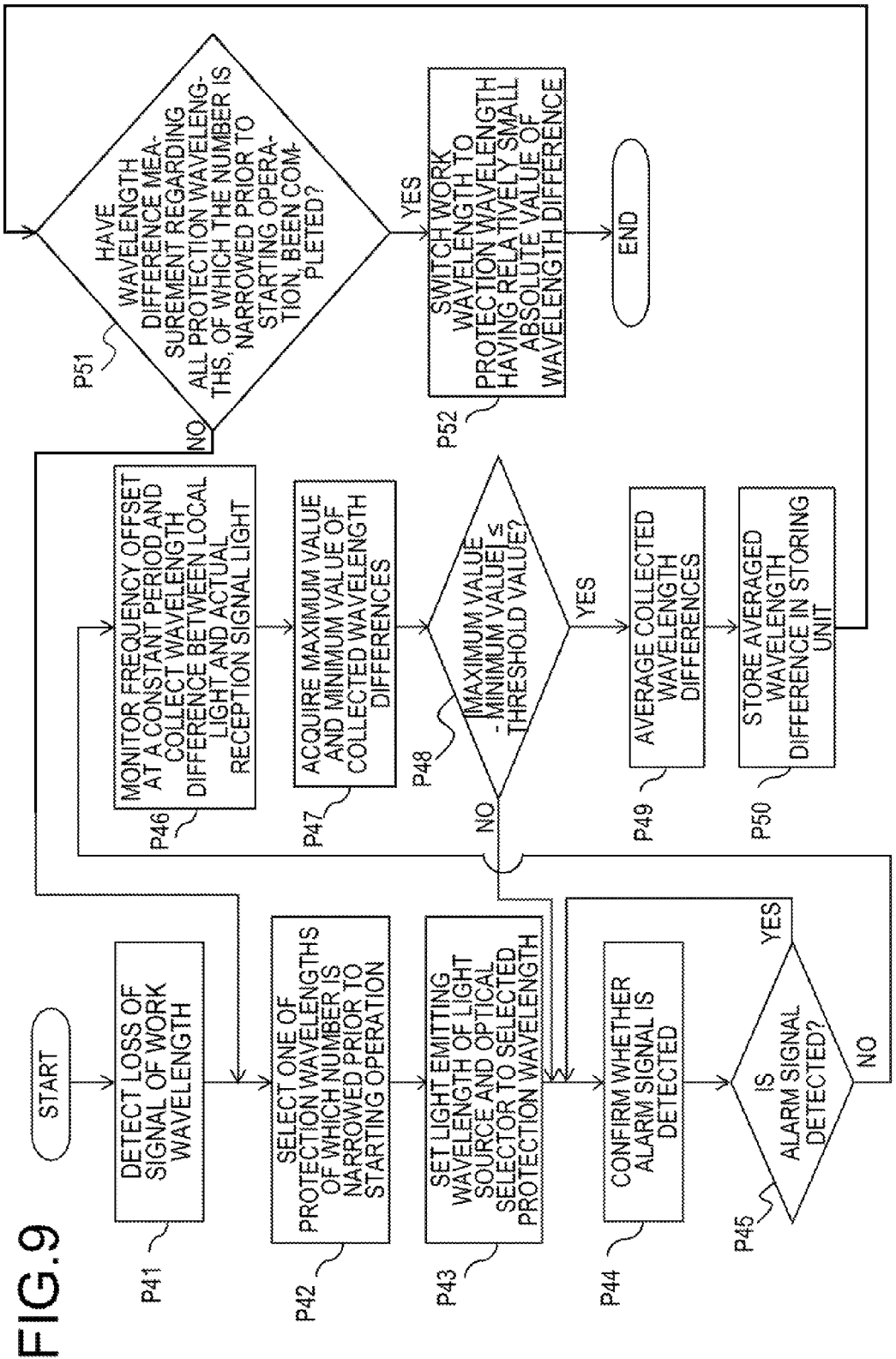
FIG. 9 is a flowchart for explaining another example of selection and determination of a protection wavelength based on a frequency offset according to the second embodiment.

For example, as illustrated in FIG. 9, it is assumed that the loss of a signal of a work path (e.g., wavelength C) is detected in the TRP 12 (illustratively, wavelength determination unit 228 illustrated in FIG. 6) (Operation P41).

The TRP 12 may select one of Nc protection wavelengths, of which number is narrowed down prior to starting operation, of the measurement candidate as a frequency offset measuring target according to the detection of the loss of a signal of the work path (Operation P42).

The TRP 12, illustratively, may set a light emitting wavelength of the light source 131 to the wavelength selected as the measuring target and control the light emitting wavelength according to the selection of a protection wavelength of the measuring target. Additionally, the TRP 12 may set a wavelength allowed to pass through the optical selector 134 to the wavelength selected as the measuring target and control the wavelength allowed to pass through (Operation P43).

Thereafter, the TRP 12 may confirm whether the alarm signal indicating that signal light is not able to be normally received is not detected (in other words, alarm signal is released) (Operations P44 and P45).

When it is confirmed that the alarm signal is detected ("YES" at Operation P45), the TRP 12 may wait until the alarm signal is released.

When it is confirmed that the alarm signal is released ("NO" at Operation P45), the TRP 12 may monitor the frequency offset between the reception signal light having passed through the optical selector 134 and local light and collect the wavelength difference, by the frequency offset monitor 225 (Operation P46).

A monitor period of frequency offset, illustratively, may be a constant period, for example, 10 ms to 100 ms. When the monitor period is set to a too short period, a measurement error may be increased, and thus, the monitor period may be set in an appropriated period within an allowable range.

The TRP 12, illustratively, may acquire the maximum value and the minimum value of the wavelength differences obtained during the monitor period (Operation P47), and check whether an absolute value of a difference between the maximum value and the minimum value of the wavelength differences is less than or equal to a predetermined threshold value or not (Operation P48).

When it is determined that the absolute value exceeds the threshold value ("NO" at Operation P48), the TRP 12 may determine that variation in the wavelength difference obtained during the monitor period is too large and thus reliability of the monitored result is low. According to the determination, the TRP 12 may return to Operation P44 and subsequent operations and perform the wavelength difference measurement again.

The alarm confirmation processing (P44 and P45) described above may be optional processing. Either one or both of the reliability confirmation processing (Operations P47 and P48) and the averaging processing (P49) regarding the wavelength difference may also be optional processing.

In the meantime, when the absolute value of the difference between the maximum value and the minimum value of the wavelength differences is less than or equal to the threshold value ("YES" at Operation P48), the TRP 12 may average the wavelength differences obtained during the monitor period (Operation P49) and store the averaged wavelength difference in the storing unit 229 (Operation P50).

Thereafter, the TRP 12 may check whether the wavelength difference measurements regarding all protection wavelengths, of which the number is narrowed down prior to starting operation, have been completed (Operation P51).

When it is determined that the wavelength difference measurements for all protection wavelengths have not been completed ("NO" at Operation P51), the TRP 12 may return to Operation P42, select an unmeasured protection wavelength of Nc protection wavelengths for a candidate as a wavelength to be measured, and then, perform the processing of Operation P43 and subsequent operations.

When it is determined that the wavelength difference measurements for Nc protection wavelengths, of which the number is narrowed down prior to starting operation, have been completed ("YES" at Operation P51), the TRP 12 may switch to the protection wavelength of the work wavelength C based on information of the storing unit 229.

For example, the TRP 12 may change the light emitting wavelength of the light source 131 from the work wavelength to the wavelength having a relatively small absolute value (the minimum value as one non-limiting example) of the wavelength difference so as to switch the work wavelength C to the protection wavelength (Operation P52).

As described above, according to the second embodiment, prior to starting operation of the optical network 1, since the number of protection wavelengths of a candidate for the frequency offset measurement is narrowed down prior to starting operation of the optical network 1, it is possible to decrease the time taken until the work wavelength is switched to the protection wavelength from the failure detection of the work wavelength after starting operation.

Further, in the second embodiment, since the measurement and confirmation of the frequency offset regarding the protection wavelength, of which the number is narrowed down prior to operation, are performed again according to the failure detection of the work wavelength after starting operation, it is possible to enhance the reliability of path switching.

For example, according to the second embodiment, even when the protection wavelength having a relatively small wavelength difference and a good signal quality prior to starting operation is different from that after starting operation, it is possible to reliably switch the work wavelength to the protection wavelength having a good signal quality after starting operation.

Accordingly, it is possible to avoid or suppress the protection wavelength having a relatively degraded signal quality from being selected as a switching destination of the work wavelength, after starting operation, thereby capable of enhancing the reliability of path switching.

Third Embodiment

Next, descriptions will be made on an example of selection and determination of a protection wavelength based on a frequency offset according to a third embodiment with reference to FIG. 10 and FIG. 11.

Figure 10:
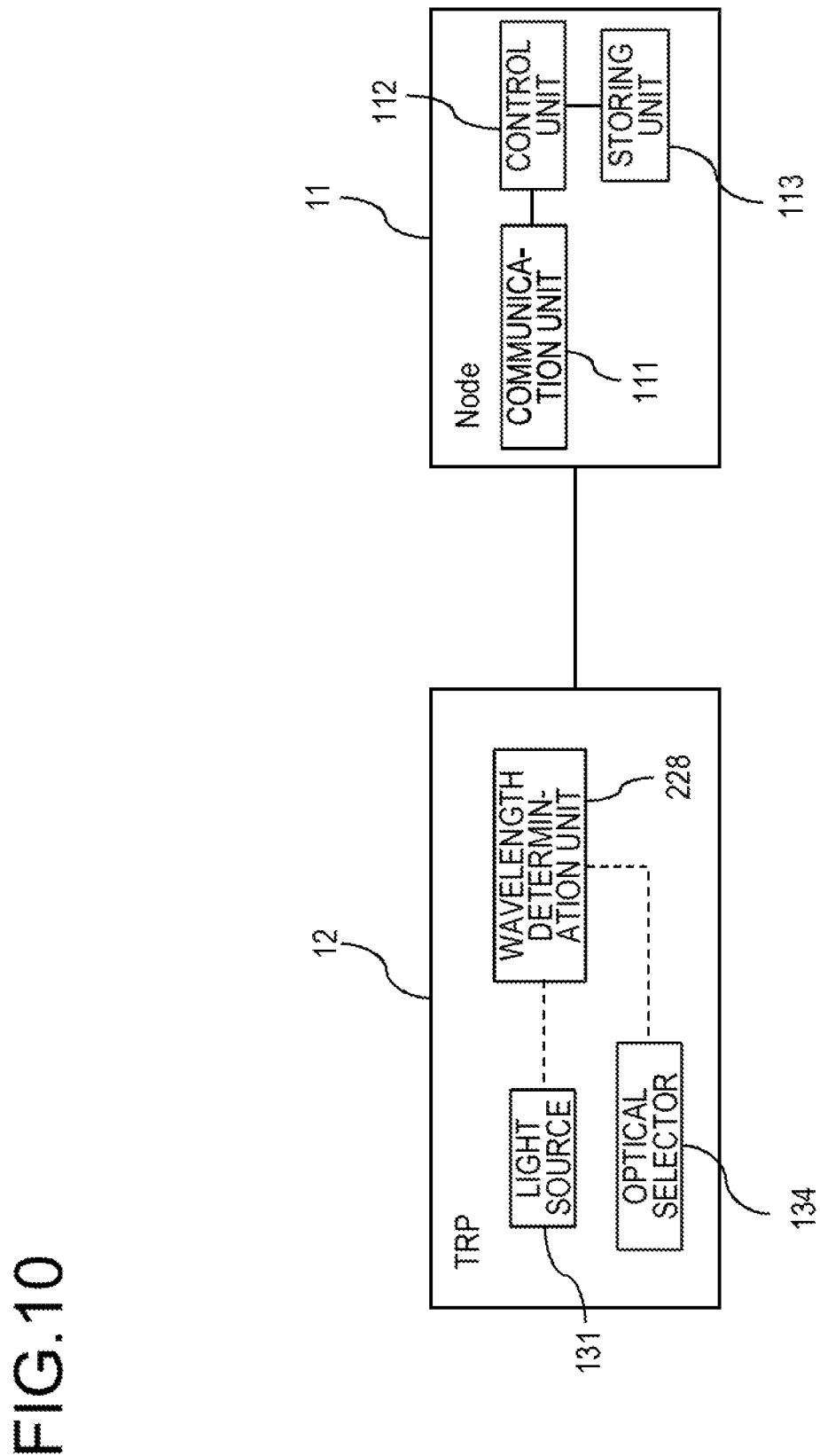
FIG. 10 is a block diagram illustrating a configuration obtained by paying attention to a certain node and a TRP unit exemplified in FIG. 1, according to a third embodiment.

FIG. 10 is a block diagram illustrating an exemplary configuration obtained by paying attention to a certain node 11 and the TRP 12 connected to the node 11 as in FIG. 6. In FIG. 10, the node 11, illustratively, may include a communication unit 111, a control unit 112, and a storing unit 113.

The communication unit 111 is able to communicate with the TRP 12 to perform the above-described protection wavelength selection notification with respect to the TRP 12 or receive information of the protection wavelength selected and determined by the TRP 12 from the TRP 12.

In the third embodiment, the TRP 12 may measure the frequency offset of the protection wavelength as described in the first embodiment (FIG. 7) or the second embodiment (FIG. 9). The TRP 12 may measure the frequency offset of the work wavelength by the frequency offset monitor 225 after starting operation of the optical network 1. The frequency offset measurement of the work wavelength may be performed periodically after starting operation of the optical network 1.

The TRP 12 may transmit information of each of frequency offsets of the measured work wavelength and the protection wavelength to the node 11. The node 11 may receive information of the frequency offset by, for example, the communication unit 111.

The information of the frequency offset received by the communication unit 111, illustratively, may be provided to the control unit 112. The control unit 112 may store information of each frequency offset of the work wavelength and the protection wavelength in the storing unit 113 in association with a work route and a protection route.

In FIG. 11, an example of information to be stored in the storing unit 113 is illustrated. The information is an example of information to enable reselection by the node 11 based on the frequency offset of the protection wavelength, and for the sake of convenience, may be referred to as a "wavelength route versus protection wavelength selection information." The "wavelength route versus protection wavelength selection information" may be stored in the storing unit 113 as information in a table format, as illustrated in FIG. 11.

In the example of FIG. 11, it is assumed that the TRP 12 is able to receive eight wavelengths λ1 to λ8, the wavelength λ1 is a wavelength "being in operation" (work wavelength), and the wavelengths λ2 to λ8 are available for protection wavelengths with respect to the work wavelength λ1.

As illustrated in FIG. 11, information of items for a "route", a "frequency offset" (starting-up, during operation, and total), and a "protection candidate" for each of the wavelengths λ1 to λ8 may be stored in the storing unit 113.

The information indicating a route to which each of the wavelengths λ2 to λ8 is allocated may be registered in the "route." In the example of FIG. 11, the wavelengths λ1, λ7, and λ8 are allocated to the route C illustrated in FIG. 1. Similarly, the wavelengths λ2, λ3, and λ6 are allocated to the route D, and the wavelengths λ4 and λ5 are allocated to the route E. The information indicating of which wavelength is allocated to which route is information capable of being recognized and identified by the node 11.

Illustratively, information of the frequency offsets measured at "starting-up" and "during operation" of the optical network 1 and a total of frequency offsets of the "starting-up" and the "during operation" may be registered in the "frequency offset."

Also, information indicating which of the wavelengths λ1 and λ8 is being in operation (in other words, work wavelength) and information indicating a protection wavelength with respect to the work wavelength may be registered in the "protection candidate."

In FIG. 11, the control unit 112 may register the "frequency offset (during operation)" of the work wavelength λ1 in the "frequency offset (during operation)" of the protection wavelengths λ7 and λ8 that are allocated to the same route C as for the work wavelength λ1.

In other words, the control unit 112 may update the protection wavelengths λ7 and λ8 allocated to the same route C as for the work wavelength λ1 with the "frequency offset (during operation)" of the work wavelength λ1.

This is because it is allowed to estimate and determine that the same frequency offset as the work wavelength λ1 is generated in the wavelengths λ7 and λ8 allocated to the same route C as for the work wavelength λ1.

The control unit 112 may reselect a candidate for the protection wavelength which becomes the switching destination of the work wavelength based on a "total" of the "frequency offset" of the "starting-up" and the "during operation."

For example, when variation in the frequency offset of the work wavelength λ1 is present, the variation is reflected to the frequency offset (during operation) of the protection wavelengths λ7 and λ8. Accordingly, the control unit 112 may select the wavelength having a relatively small total frequency offset of the protection wavelengths in which the variation is reflected as the candidate for the protection wavelength for the switching destination of the work wavelength λ1 again.

Accordingly, even the variation in the frequency offset of the work wavelength is present, the node 11 is able to adaptively select a protection wavelength having a better signal quality according to the variation again, and thus, it is possible to enhance reliability of the path switching.

In the meantime, when the TRP 12 is built in the node 11, the control unit 112 of the node 11 and the wavelength determination unit 228 of the TRP 12 may be integrated with each other as a single control unit. The storing unit 113 of the node 11 and the storing unit 229 of the storing unit 229 may also be integrated with each other as a single storing unit.

Fourth Embodiment

Next, descriptions will be made on an example of selection and determination of a protection wavelength based on a frequency offset according to a fourth embodiment with reference to FIG. 12 to FIG. 18. In the third embodiment described above, descriptions have been made on the selection and determination of the protection wavelength regarding a single TRP 12. In the fourth embodiment, descriptions will be made on the selection and determination of the protection wavelength regarding a plurality of TRPs 12.

Figure 12:
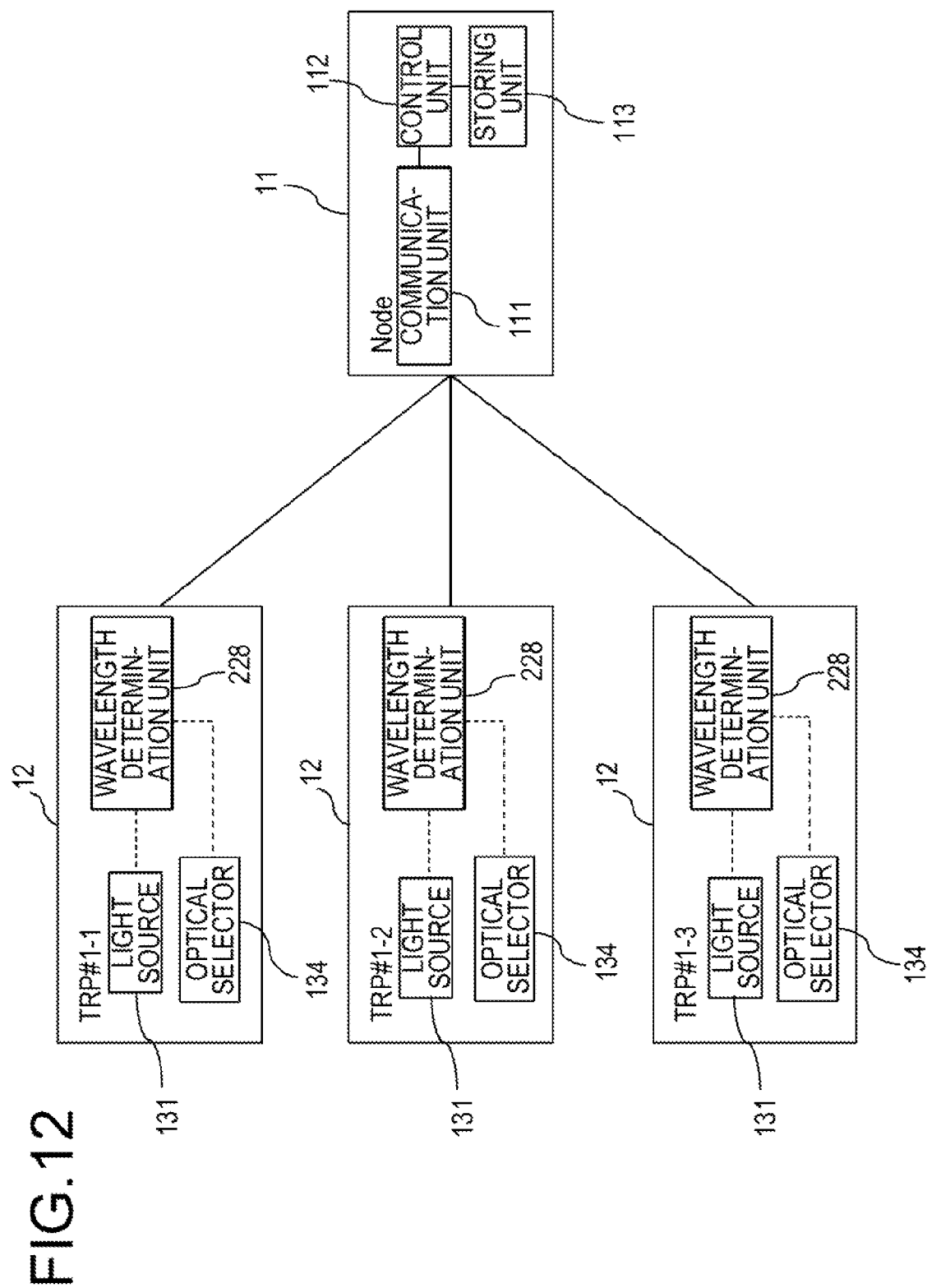
FIG. 12 is a block diagram illustrating a configuration obtained by paying attention to a certain node and a TRP unit exemplified in FIG. 1, according to a fourth embodiment.

FIG. 12 is a block diagram illustrating an exemplary configuration obtained by paying attention to a certain node 11 and a plurality of TRPs 12 (#1-x) connected to the node 11. In the meantime, x is an integer number of 2 or more, and x is one of 1 to 3 in the example of FIG. 12.

In FIG. 12, the configuration of each TRP #1-x may be the same as or similar to the exemplary configuration of the TRP 12 illustrated in FIG. 10. The configuration of the node 11 may also be the same as or similar to the configuration illustrated in FIG. 10.

As illustrated in FIG. 13A, the node 11 may notify the protection wavelength of which the frequency offset is to be measured to each TRP #1-x by, for example, the control unit 112 and the communication unit 111 (Operation P61). The notification (may be referred to as a "designation"), illustratively, may be performed prior to starting operation of the optical network 1 (e.g., starting-up of each TRP #1-x).

Each TRP #1-x receives a notification of a protection wavelength, of which the frequency offset is to be measured, from the node 11 (Operation P71). Each TRP #1-x may monitor the frequency offset of the designated protection wavelength periodically and collect the wavelength difference in a similar manner as in the first to the third embodiments by, for example, the wavelength determination unit 228, according to the reception of the notification (Operation P72).

For example, as illustrated in FIG. 18, the TRP #1-x may set a light emitting wavelength of the light source 131 to the protection wavelength notified form the node 11 and control the light emitting wavelength. Also, the TRP #1-x may set a wavelength allowed to pass through the optical selector 134 to the protection wavelength notified from the node 11 (Operation P721).

Thereafter, the TRP #1-x may confirm whether an alarm signal indicating that signal light is not able to be normally received is detected (Operations P722 and P723).

When it is determined that the alarm signal is detected ("YES" at Operation P723), the TRP #1-x may wait until the alarm signal is released.

When the release of the alarm signal is confirmed ("NO" at Operation P723), the TRP #1-x monitors the frequency offset between the reception signal light and the local light and collects the wavelength difference, by the frequency offset monitor 225 (Operation P724).

A monitor period of a frequency offset illustratively may be a constant period, for example, 10 ms to 100 ms. When the monitor period is set to a too short period, a measurement error may be increased, and thus, the monitor period may be set in an appropriate period within an allowable range.

The TRP #1-x illustratively may acquire the maximum value and the minimum value of the wavelength differences obtained during the monitor period (Operation P725), and check whether an absolute value of a difference between the maximum value and the minimum value of the wavelength differences is less than or equal to a predetermined threshold value or not (Operation P726).

When it is determined that the absolute value of the difference between the maximum value and the minimum value of the wavelength differences exceeds the threshold value ("NO" at Operation P726), the TRP #1-x may determine that variation in the wavelength difference obtained during the monitor period is too large and thus reliability of the monitored result is low. According to the determination, the TRP #1-x may return to Operation P722 and subsequent operations and perform the wavelength difference measurement again.

In the meantime, when the absolute value of the difference between the maximum value and the minimum value of the wavelength difference is less than or equal to the threshold value ("YES" at Operation P726), the TRP #1-x may average the wavelength differences during the monitor period (Operation P19). The averaged wavelength difference may be stored in the storing unit 229 (Operation P727).

Figure 13:
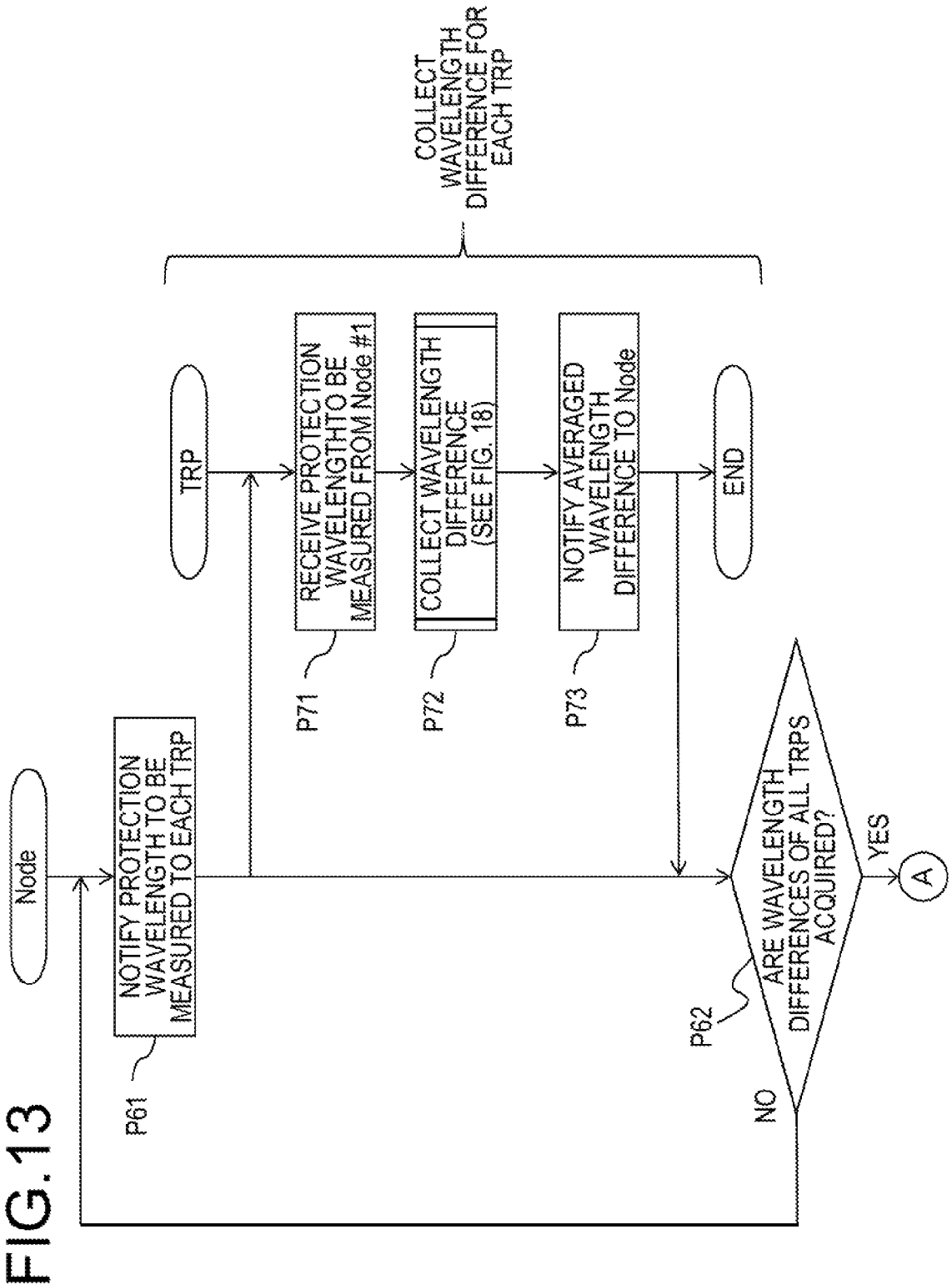
FIG. 13 is a flowchart for explaining an example of selection and determination of a protection wavelength based on a frequency offset according to the fourth embodiment.

The alarm confirmation processing (P722 and P723) described above may be optional processing. Either one or both of the reliability confirmation processing (Operations P725 and P726) and the averaging process (P727) regarding the wavelength difference may be optional processing Each TRP #1-x may notify the averaged wavelength difference to the node 11, as illustrated in FIG. 13 (Operation P73). The notification illustratively may be performed by the wavelength determination unit 228.

The node 11 may confirm whether the wavelength difference measured at each TRP #1-x is received from each TRP #1-x which has performed the notification of the protection wavelength of which the frequency offset is to be measured at Operation P61 (Operation P62).

When it is determined that a measurement result of the wavelength difference is not received from any one of the TRPs #1-x ("NO" at Operation P62), the node 11 may repeat the processing at Operation P61 and subsequent operations until the measurement results of the wavelength differences are received from all TRPs #1-x (until it is determined that the result of at Operation P62 is "YES").

When it is determined that the measurement results of the wavelength differences are received from all TRPs #1-x ("YES" at Operation P62), the node 11, for example, may generate and build information in which the protection wavelength (illustratively, three wavelengths λ1 to λ3) and the wavelength difference are associated with each TRP #1-x as illustrated in FIG. 15.

The information illustrated in FIG. 15, for the sake of convenience, may be referred to as a "wavelength versus wavelength difference information for each TRP." The "wavelength versus wavelength difference information for each TRP," illustratively, may be generated by the control unit 112 of the node 11 and may be stored in the storing unit 113 as information in a table format.

Figure 14:
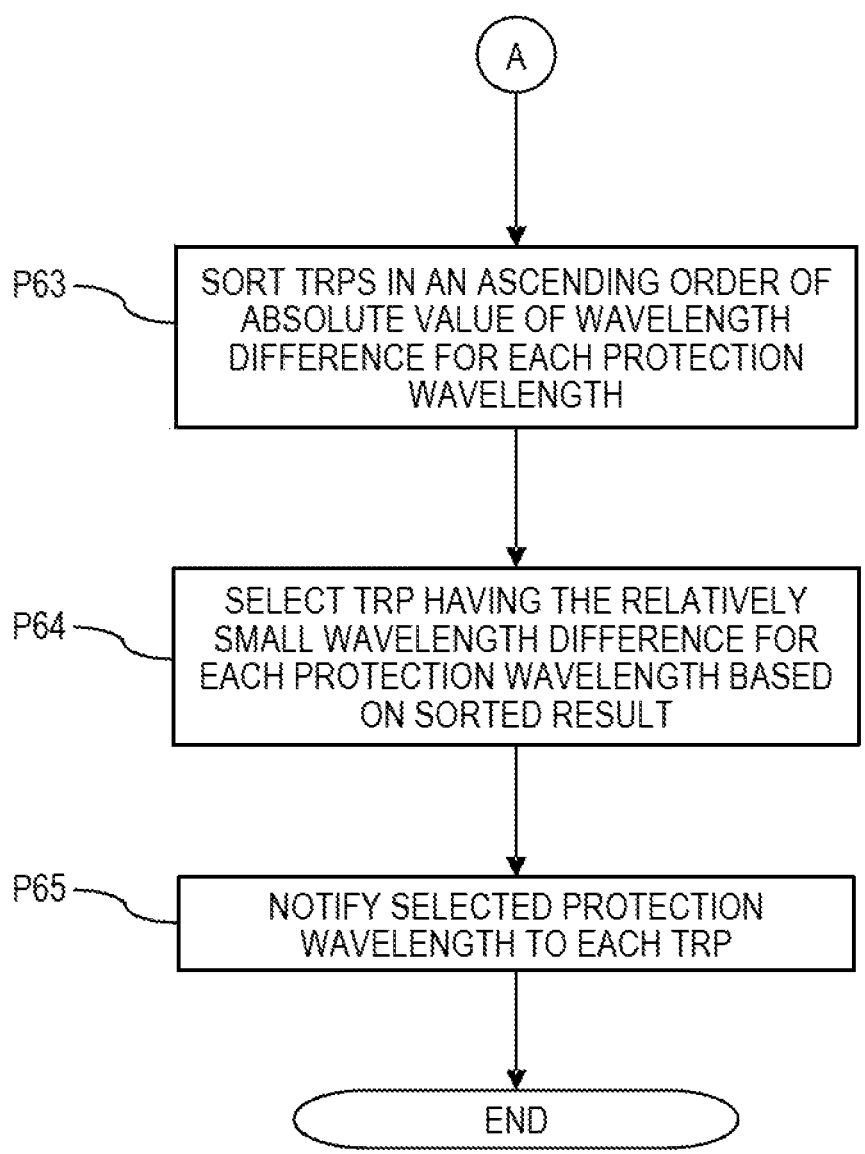
FIG. 14 is a flowchart for explaining another example of selection and determination of the protection wavelength based on the frequency offset, according to the fourth embodiment.

The node 11 may sort the TRPs #1-x using an absolute value of the wavelength difference for each protection wavelength as illustrated in FIG. 14 based on the wavelength versus wavelength difference information for each TRP illustrated in FIG. 15 (Operation P63).

The sorting illustratively may be performed by the control unit 112 and may be, for example, an ascending order. When the protection wavelengths having the same wavelength difference are present, the TRPs #1-x illustratively may be sorted in an ascending order of numbers (e.g., x) allocated to the TRPs #1-x.

In FIG. 16, an example of the sorted result is illustrated. In the example of FIG. 16, the TRPs #1-x are sorted in order of TRP #1-1, #1-2, and #1-3 regarding the protection wavelength λ1. Regarding the protection wavelength λ2, the TRPs #1-x are sorted in order of TRP #1-2, #1-1, and #1-3. Regarding the protection wavelength λ3, the TRPs #1-x are sorted in order of TRP #1-3, #1-1, and #1-2.

The mode 11 may select the TRP #1-x having the smallest wavelength difference for each of the protection wavelengths λ1 to λ3 based on the sorted result (Operation P64 in FIG. 14). For example, as illustrated in FIG. 17, the TRP #1-1 is selected for the protection wavelength λ1, the TRP #1-2 is selected for the protection wavelength λ2, and the TRP #1-3 is selected for the protection wavelength λ3.

The node 11 may notify a corresponding protection wavelength to each of the selected TRPs #1-x (Operation P65 in FIG. 14). For example, the node 11 may notify the protection wavelength λ1 to the TRP #1-1, the protection wavelength λ2 to the TRP #1-2, and the protection wavelength λ3 to the TRP #1-3.

With this, each TRP #1-x may determine and set the protection wavelength for the switching destination for a case where a failure occurs in the work wavelength to a wavelength, which has the relatively small wavelength difference and a good signal quality, notified from the node 11.

In the example described above, although selection and determination of the protection wavelength of each TRP #1-x is performed in the node 11, information of the measured wavelength difference may be communicated between the TRPs #1-x so as to cause the TRP #1-x to autonomously perform the selection and determination of the protection wavelength.

When each TRP #1-x is built in the node 11, the control unit 112 of the node 11 and the wavelength determination unit 228 of each TRP #1-x may be integrated with each other as a single control unit. The storing unit 113 of the node 11 and the storing unit 229 of the storing unit 229 may also be integrated with each other as a single storing unit.

Fifth Embodiment

In the configuration of the fourth embodiment illustrated in FIG. 12, the node 11 may update the frequency offset of the protection wavelength allocated to the same route as for the work wavelength for each TRP #1-x, according to the variation in the frequency offset of the work wavelength, similar to the third embodiment.

For example, the node 11 may store information, which is obtained by expanding the "wavelength route versus protection wavelength selection information" illustrated in FIG. 11 for each TRP #1-x as illustrated in FIG. 19, in the storing unit 113.

The information illustrated in FIG. 19 is an example of information enabling reselection based on the frequency offset of the protection wavelength for each TRP #1-x and for the sake of convenience, may be referred to as the "wavelength route versus protection wavelength selection information for each TRP."

The node 11 may generate and build the "wavelength route versus protection wavelength selection information for each TRP," for example, in the control unit 112 based on frequency offset information of the work wavelength and the protection wavelength notified from each TRP #1-x.

In the example of FIG. 19, it is assumed that each TRP #1-x is able to receive eight wavelengths λ1 to λ8. In the TRP #1-1, illustratively the wavelength λ1 is a wavelength (work wavelength) "being in operation," and the wavelengths λ4 to λ8 are available for the protection wavelength regarding the work wavelength λ1. In the meantime, the wavelengths λ2 and λ3 are settings which are not available (NA) for the protection wavelength in the TRP #1-1.

In the TRP #1-2, illustratively the wavelength λ2 is a work wavelength, and the wavelength λ1 and the wavelengths λ3 to λ8 are available for the protection wavelength regarding the work wavelength λ2, and the wavelength λ1 is a setting which is not available (NA) for the protection wavelength.

In the TRP #1-3, illustratively the wavelength λ3 is a work wavelength, and the wavelengths λ4 to λ8 are available for the protection wavelength regarding the work wavelength λ3, and the wavelengths λ1 and λ2 are settings which are not available (NA) for the protection wavelength.

As illustrated in FIG. 19, the "wavelength route versus protection wavelength selection information for each TRP" may include information of the "route," the "frequency offset" (starting-up, during operation, and total) and the "protection candidate" for each TRP #1-x as well as each of the wavelengths λ1 to λ8.

The information indicating a route to which each of the wavelengths λ1 to λ8 is allocated may be registered in the "route." The example of FIG. 19 illustrates a view in which the wavelengths λ1 and λ5 of the TRP #1-1 are allocated to the route C illustrated in FIG. 1, the wavelengths λ2, λ4, λ7, and λ8 are allocated to the route D, and the wavelengths λ3 and λ6 are allocated to the route E.

The information of the frequency offset measured at "starting-up" and "during operation" of the optical network 1 and a total of frequency offsets of the "starting-up" and the "during operation" may be registered in the "frequency offset."

Also, information indicating which of the wavelengths λ1 to λ8 is being in operation (in other words, work wavelength) and information indicating a protection wavelength with respect to the work wavelength may be registered in the "protection candidate."

The control unit 112 may update the "frequency offset (during operation)" of the protection wavelength λ5 which is allocated to the same route C as for the work wavelength λ1 with the "frequency offset (during operation)" of the work wavelength λ1 in the TRP #1-1. This is because it is allowed to estimate and determine that the same frequency offset as the work wavelength λ1 is generated in the wavelength λ5 allocated to the same route C as for the work wavelength λ1.

Similarly, the control unit 112 may update the "frequency offset (during operation)" of the protection wavelengths λ4, λ7, and λ8 that are allocated to the same route D as for the work wavelength λ2 with the "frequency offset (during operation)" of the work wavelength λ2 in the TRP #1-2.

The control unit 112 may update the "frequency offset (during operation)" of the protection wavelengths λ4, λ7, and λ8 that are allocated to the same route E as for the work wavelength λ3 with the "frequency offset (during operation)" of the work wavelength λ3 in the TRP #1-3.

The control unit 112 may reselect a candidate for the protection wavelength which becomes the switching destination of the work wavelength for each TRP #1-x based on the "total" of the "frequency offset" of the "starting-up" and "during operation."

Accordingly, when the variation in any one of the frequency offsets of the work wavelengths λ1 to λ3 is present, the variation is reflected to the frequency offset of the "during operation" of the protection wavelength allocated to the same route as for the work wavelength.

Accordingly, the control unit 112 may select the wavelength having a relatively small total frequency offsets of the protection wavelengths in which the variation is reflected as the candidate for the protection wavelength for the switching destination of the work wavelength for each TRP #1-x.

Accordingly, even when the variation in the frequency offset of the work wavelength is present, the node 11 is able to adaptively select a protection wavelength having a better signal quality again according to the variation for each TRP #1-x, and thus, it is possible to enhance reliability of the path switching.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device comprising:
a light source configured to generate light used for coherent detection processing of reception light;
a monitor configured to monitor a frequency offset between the reception light having a plurality of protection wavelengths and the light generated by the light source, based on a signal obtained by the coherent detection processing of the reception light having the plurality of protection wavelengths available for a work wavelength by the light generated by the light source; and
a controller configured to select a protection wavelength to be switched to the work wavelength among the plurality of protection wavelengths, based on the frequency offset monitored by the monitor.

2. The optical transmission device according to claim 1, wherein the controller is configured to select the protection wavelength having a smaller frequency offset to be switched to the work wavelength among the plurality of protection wavelengths.

3. The optical transmission device according to claim 1, wherein the controller is configured to select a plurality of protection wavelengths having smaller frequency offsets, select the protection wavelength to be switched to the work wavelength among the plurality of protection wavelengths selected in advance, based on the frequency offset monitored by the monitor after detection of loss of the reception light having the work wavelength, and switch the wavelength of the reception light where the loss is detected from the work wavelength to the selected protection wavelength.

4. The optical transmission device according to claim 1, wherein the monitor, while being in operation, is configured to monitor a frequency offset between the reception light having the work wavelength and the light generated by the light source, and
wherein the controller is configured to update a frequency offset between the light generated by the light source and light having the protection wavelength allocated to a route to which light having the work wavelength is allocated, with the frequency offset monitored by the monitor while being in operation.

5. A protection wavelength selection method comprising:
executing coherent detection processing of reception light having a plurality of protection wavelengths available for a work wavelength by light generated by a light source;
monitoring a frequency offset between the reception light having the plurality of protection wavelengths and the light generated by the light source, based on a signal obtained by the coherent detection processing; and
selecting a protection wavelength to be switched to the work wavelength among the plurality of protection wavelengths, based on the monitored frequency offset.

* * * * *